United States Patent
Steensgaard

(10) Patent No.: US 6,202,202 B1
(45) Date of Patent: *Mar. 13, 2001

(54) POINTER ANALYSIS BY TYPE INFERENCE FOR PROGRAMS WITH STRUCTURED MEMORY OBJECTS AND POTENTIALLY INCONSISTENT MEMORY OBJECT ACCESSES

(75) Inventor: Bjarne Steensgaard, North Bend, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/719,144

(22) Filed: Sep. 24, 1996

(51) Int. Cl.$^7$ .................................................. G06F 9/45

(52) U.S. Cl. ........................................................ 717/8

(58) Field of Search .................................. 395/705, 707, 395/708, 836; 711/100, 111, 117; 717/8

(56) References Cited

U.S. PATENT DOCUMENTS 5,689,665 * 11/1997 Mitsui et al. .......................... 345/342
5,790,866   8/1998 Robison .

OTHER PUBLICATIONS

Aho, et. al., "Compilers, Principles, Techniques, and Tools", pp. 11 and 22.*
Aho et al; Compilers, Principles, Techniques, and Tools; pp. 4–9, 11, 399–400, 473–488 and 527–528, 1986.*
Booch et al, "Software Engineering with ADA" pp. 89–132, 1994.*
Compleat C, by J.F. Peters and Hamed M. Sallam, pp. 298–309, 1986.*
Aho, Alfred V., et al., *Compilers: Principles, Techniques, and Tools,* Addison—Wesley Publishing Company, Contents and Chapter 6, pp. vii–x and 343–388 (1986).
Agesen, Ole, *Concrete Type Inference: Delivering Object–Oriented Applications,* Ph.D. Thesis, Stanford University, Abstract and Table of Contents, pp. i–ii, iv, and vi–viii (Dec. 1995).

(List continued on next page.)

*Primary Examiner*—Todd R. Swann
*Assistant Examiner*—Matthew Smithers
(74) *Attorney, Agent, or Firm*—Schwegman, Lundberg, Woessner & Kluth, P.A.

(57) ABSTRACT

A pointer analysis by type inference for a computer program ith structured memory objects and potentially inconsistent memory object accesses helps approximate run-time store usage for the program. The analysis represents locations for the program with types describing access patterns for the represented locations based on how the locations are accessed in the program. The analysis describes access patterns for structured memory objects, elements of structured memory objects, and memory objects accessed in inconsistent manners in the program. The analysis identifies store usages described by the program and determines whether the location(s) and/or function(s) affected by the identified store usages are well-typed under typing constraints. If the identified store usages are not well-typed, the analysis modifies types for location(s) and/or function(s) affected by the identified store usages as necessary so the store usages are well-typed. When the locations and/or functions for all identified store usages are well-typed, the program is well-typed with the set of types defining a store model for the program.

71 Claims, 4 Drawing Sheets

Microfiche Appendix Included
(1 Microfiche, 18 Pages)

OTHER PUBLICATIONS

Aiken, Alexander, et al., "Better Static Memory Management: Improving Region–Based Analysis of Higher–Order Languages," SIGPLAN '95 Conference on Programming Language Design and Implementation, La Jolla, California, pp. 174–185 (Jun. 1995).

Birkedal, Lars, et al., "From Region Inference to von Neumann Machines via Region Representation Inference," Proceedings of the 23rd SIGPLAN–SIGACT Symposium on Principles of Programming Languages, St. Petersburg, Florida, pp. 171–183 (Jan. 1996).

Cousot, Patrick et al., "Abstract Interpretation: A Unified Lattice Model for Static Analysis of Programs by Construction or Approximation of Fixpoints," Proceedings of the Fourth Annual ACM Symposium on Principles of Programming Languages, pp. 238–252 (Jan. 1977).

Damas, Luis, et al., "Principal Type–Schemes for Functional Programs," Conference Record of the Ninth Annual ACM Symposium on Principles of Programming Languages, Albuquerque, New Mexico, pp. 207–212 (Jan. 1982).

Heintze, Nevin, Set Based Program Analysis, Ph.D. Thesis, Carnegie Mellon University, Abstract Contents, and Chapter 1, pp. i–iv and 1–6 (1992).

Henglein, Fritz, "Type Inference with Polymorphic Recursion," ACM Transcations on Programming Languages and Systems, vol. 15, No. 2, pp. 253–289 (Apr. 1993).

Mairson, Harry G., "Deciding ML Typability is Complete for Deterministic Exponential Time," Proceedings of the Seventeenth Annual ACM Symposium on Principles of Programming Languages, pp. 382–401 (Jan. 1990).

Mycroft, Alan, "Polymorphic Type Schemes and Recursive Definitions," Lecture Notes in Computer Science, vol. 167, Proceedings of the International Symposium on Programming 6th Colloquium, Toulouse, pp. 217–228 (Apr. 17–19, 1984).

Talpin, Jean–Pierre, et al., Syntactic Control of Type Polymorphism for Recursive Function Definitions, Technical Report ECRC–94–29, European Computer–Industry Research Centre GmbH, pp. I–III, 1–15, and i–xiv (Jul. 1994, Revised Feb. 1995).

Talpin, Jean–Pierre, et al., "Syntactic Type Polymorphism for Recursive Function Definitions," Workshop on Types for Program Analysis, pp. 80–94 (May 26–27, 1995).

Andersen, Lars Ole, Program Analysis and Specialization for the C Programming Language, Ph.D. Thesis, DIKU, University of Copenhagen, Denmark (May 1994).

Austin, Todd M., et al., "Efficient Detection of All Pointer and Array Access Errors," SIGPLAM '94 Conference on Programming Language Design and Implementation, Orlando, Florida, pp. 290–301 (Jun. 1994).

Burke, Michael, et al., "Flow–Insensitive Interprocedural Alias Analysis in the Presence of Pointers", Research Report RC 19546, IBM T.J. Watson Research Center, Yorktown Heights, New York, pp. 1–21 (Sep. 1994).

Chase, David R., et al., "Analysis of Pointers and Structures," Proceedings of the ACM SIGPLAN '90 Conference on Programming Language Design and Implementation, White Plains, New York, pp. 296–310 (Jun. 20–22, 1990).

Choi, Jong–Deok, et al., "Efficient Flow–Sensitive Interprocedural Computation of Pointer–Induced Aliases and Side Effects," Twentieth Annual ACM SIGPLAN–SIGACT Symposium on Principles of Programming Languages, Charleston, South Carolina, pp. 232–245 (Jan. 10–13, 1993).

Choi, Jong–Deok, et al., "On the Efficient Engineering of Ambitious Program Analysis," IEEE Transactions on Software Engineering, vol. 20, No. 2, pp. 105–114 (Feb. 1994).

Cytron Ron, et al., "Efficiently Computing Static Single Assignment Form and the Control Dependence Graph," ACM Transactions on Programming Languages and Systems, vol. 13, No. 4, pp. 451–490 (Oct. 1991).

Deutsch, Alain, "A Storeless Model of Aliasing and its Abstractions using Finite Representations of Right–Regular Equivalence Relations," Proceedings of the IEEE 1992 International Conference on Computer Languages, Oakland, California, pp. 2–13 (Apr. 1992).

Deutsch, Alain, "Interprocedural May–Alias Analysis for Pointers: Beyond k–limiting," SIGPLAN '94 Conference on Programming Language Design and Implementation, Orlando, Florida, pp. 230–241 (Jun. 1994).

Emami, Maryam, et al., "Context–Sensitive Interprocedural Points–to Analysis in the Presence of Function Pointers," ACAPS Technical Memo 54, Advanced Compilers, Architectures and Parallel Systems Group, School of Computer Science, McGill University, Montreal, Canada, pp. 1–28 (Nov. 12, 1993).

Henglein, Fritz, "Efficient Type Inference for Higher–Order Binding–Time Analysis," Functional Programming Languages and Computer Architecture, 5th ACM Conference, Cambridge, Massachusetts, pp. 448–472 (Aug. 26–30, 1991).

Kahn, G., "Natural Semantics," Lecture Notes in Computer Science, vol. 247, STACS 87 4th Annual Symposium on Theoretical Aspects of Computer Science, Passau, Federal Republic of Germany, pp. 22–39 (Feb. 19–21, 1987).

Landi, William, et al., "A Safe Approximate Algorithm for Interprocedural Pointer Aliasing," Proceedings of the SIGPLAN '92 Conference on Programming Language Design and Implementation, pp. 235–248 (Jun. 1992).

Landi, William, et al., "Interprocedural Modification Side Effect Analysis With Pointer Aliasing," Proceedings of the SIGPLAN '93 Conference on Programming Language Design and Implementation, pp. 56–67 (Jun. 1993).

O'Callahan, Robert, et al., "Detecting Shared Representations Using Type Inference," Technical Report CMU–CS–95–202, School of Computer Science, Carnegie Mellon University, Pittsburgh, Pennsylvania, pp. 1–21 (Sep. 1995).

Ruf, Erik, "Context–Insensitive Alias Analysis Reconsidered," SIGPLAN '95 Conference on Programming Language Design and Implementation, La Jolla, California, pp. 13–22 (Jun. 1995).

Steensgaard, Bjarne, "Sparse Functional Stores for Imperative Programs," ACM SIGPLAN Workshop on Intermediate Representations (IR' 95), San Francisco, California, pp. 62–70 (Jan. 22, 1995).

Steensgaard, Bjarne, "Points–to Analysis in Almost Linear Time," Technical Report MSR–TR–95–08, Microsoft Research, Redmond, Washington, pp. 1–12 (Mar. 1995).

Steensgaard, Bjarne, "Points–to Analysis in Almost Linear Time," Proceedings of the 23rd SIGPLAN/SIGACT Symposium on Principles of Programming Languages, St. Petersburg, Florida, pp. 32–41 (Jan. 21–24, 1996).

Steensgaard, Bjarne "Points–to Analysis by Type Inference of Programs with Structures and Unions," Lecture Notes on Computer Science, vol. 1060, Proceedings of the 1996 International Conference on Compiler Construction, Linkobing Sweden, pp. 136–150 (Apr. 24–26, 1996).

Tarjan, Robert E., *Data Structures and Networks Algorithms,* Regional Conference Series in Applied Mathematics vol. 44, Society for Industrial and Applied Mathematics (SIAM), Table of Contents, pp. v–vi (1983).

Tofte, Mads, et al., "Implementation of the Typed Call–by–Value λ–calculus using a Stack of Regions," Proceedings of the 21st ACM SIGPLAM–SIGTACT Symposium on Principles of Programming Languages, Portland Oregon, pp. 188–201 (Jan. 17–21, 1994).

Weise, Daniel, et al., "Value Dependence Graphs: Representation Without Taxation," Proceedings of the 21st ACM SIGPLAN–SIGACT Symposium on Principles of Programming Languages, Portland, Oregon, pp. 297–310 (Jan. 17–21, 1994).

Weise, Daniel et al., "Value Dependence Graphs: Representation Without Taxation," Technical Report MSR–TR–94–03, Microsoft Research, Redmond, Washington, 14 pages (Arp. 13, 1994).

Weihl, William E., "Interprocedural Data Flow Analysis in the Presence of Pointers, Procedure Variables, and Label Variables," Seventh Annual ACM Symposium on Principles of Programming Languages, Las Vegas, Nevada, pp. 83–94 (Jan. 28–30, 1980).

Wilson, Robert P., et al., "Efficient Context–Sensitive Pointer Analysis for C Programs," SIGPLAN '95 Conference on Programming Language Design and Implementation, La Jolla, California, pp. 1–12 (Jun. 1995).

Zhang, Sean, et al., "Program Decomposition for Pointer–induced Aliasing Analysis,"Technical Report LCS–R–TR–259, Laboratory of Computer Science Research, pp. 1–37 (Mar. 1996).

* cited by examiner

POINTER ANALYSIS BY TYPE INFERENCE FOR PROGRAMS WITH STRUCTURED MEMORY OBJECTS AND POTENTIALLY INCONSISTENT MEMORY OBJECT ACCESSES

This application contains a Microfiche Appendix consisting of 18 frames, 1 sheet.

FIELD OF THE INTENTION

The present invention relates generally to the field of computer program analysis. More particularly, the present invention relates to the field of pointer analysis for computer programs.

BACKGROUND OF THE INVENTION

Software compilers compile source code in a source language into target code in a target language. The target code may be executed directly by a data processing system or linked by a suitable linker with other target code for execution by the data processing system.

To help improve the execution of target code by the data processing system, one typical compiler performs optimization techniques based on the expected run-time usage of memory locations for the compiled program as defined by a store model or storage shape graph. The compiler may generate the store model by performing a pointer analysis to determine the effects of program statements referencing memory locations with constants, variables, or functions, for example.

One typical pointer analysis by type inference treats structured memory objects, such as structures or records, as single memory locations and may therefore generate an overly conservative store model. Another typical pointer analysis by type inference describes structured memory objects and elements of structured memory objects for a program by types based only on the type declarations of the program. Such a pointer analysis, however, produces inaccurate store models for programs using arbitrary type casts, unions, and pointer arithmetic.

SUMMARY OF THE INVENTION

A method performs a pointer analysis for a program with a data processing system. The method may be implemented in software stored by a memory for execution by a data processing system. The method may perform the pointer analysis for a program browser or while compiling the program for execution by a data processing system.

For the method, a store usage in the program accessing locations is identified and may be identified based on a form of a program statement describing the store usage. Locations for the identified store usage are represented with types describing access patterns for the locations for the identified store usage based on how the locations for the identified store usage are accessed in the program such that the types representing the locations for the identified store usage comply with a typing constraint.

Each type may be represented by a type variable and an associated type constructor. A content of one of the locations for the identified store usage may be described with a location type and a function type.

One of the locations for the identified store usage may be represented with a type describing the one location is accessed as a structured memory object if the one location is accessed as a structured memory object for the identified store usage. The one location may also be represented with a type comprising location types describing locations of elements of the structured memory object. Also, one of the locations for the identified store usage may be represented with a type comprising a location type describing a location representing a structured memory object if the one location represents an element of the structured memory object.

One of the locations for the identified store usage may be represented with a type describing the one location is accessed inconsistently if an access pattern of the one location as defined by the identified store usage is different from the access pattern described by the type representing the one location. Also, one of the locations for the identified store usage may be represented with a type describing the one location is accessed inconsistently if the one location is accessed through an offset pointer.

A location pointer may be described with a location type representing a pointed-to location and with an offset describing how the location pointer points to the pointed-to location relative to a beginning of the pointed-to location. One of the locations for the identified store usage may be represented with a type describing a size of the one location based on a size of an assigned value for the identified store usage.

The method may unify types representing values of locations for the identified store usage if the types representing values of locations for the identified store usage are different and if a select one of the types representing values of locations for the identified store usage describes a potential pointer value.

The method may determine whether the types representing the locations for the identified store usage comply with the typing constraint and may determine whether the types representing the locations for the identified store usage comply with a type rule specifying the typing constraint for the identified program statement form. If the types representing the locations for the identified store usage do not comply with the typing constraint, the method modifies types representing locations for the identified store usage to comply with the typing constraint.

The method may identify any potential constraints for types representing locations for the identified store usage and may identify a potential constraint in a pending set. The method may identify from the identified store usage an access pattern relationship for types representing locations for the identified store usage. The method may identify from the identified store usage a pointer offset relationship for types representing locations for the identified store usage. The method may identify from the identified store usage any potential points-to relationships for a type representing a non-pointer value. Types representing locations for any identified potential constraints affected by the modification of types representing locations for the identified store usage may also be modified.

The method may analyze each store usage for the program only one time in an order independent of program control flow.

A data processing system performing the pointer analysis comprises a translator for translating a program in a first language into code in a second language, a pointer analyzer for performing the pointer analysis for the program, a store model for storing the types representing locations for the program, and an optimizer for optimizing the code based on the store model.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

The subject matter of this patent application is disclosed in a conference paper, Steensgaard, B., "Points-to Analysis by Type Inference of Programs with Structures and Unions," *Proceedings of the* 1996 *International Conference on Compiler Construction*, Linköbing,Sweden, Apr. 24–26, 1996, pp. 136–150, Vol. 1060, Lecture Notes on Computer Science, Springer-Verlag. This paper is herein incorporated by reference.

Figure 1:
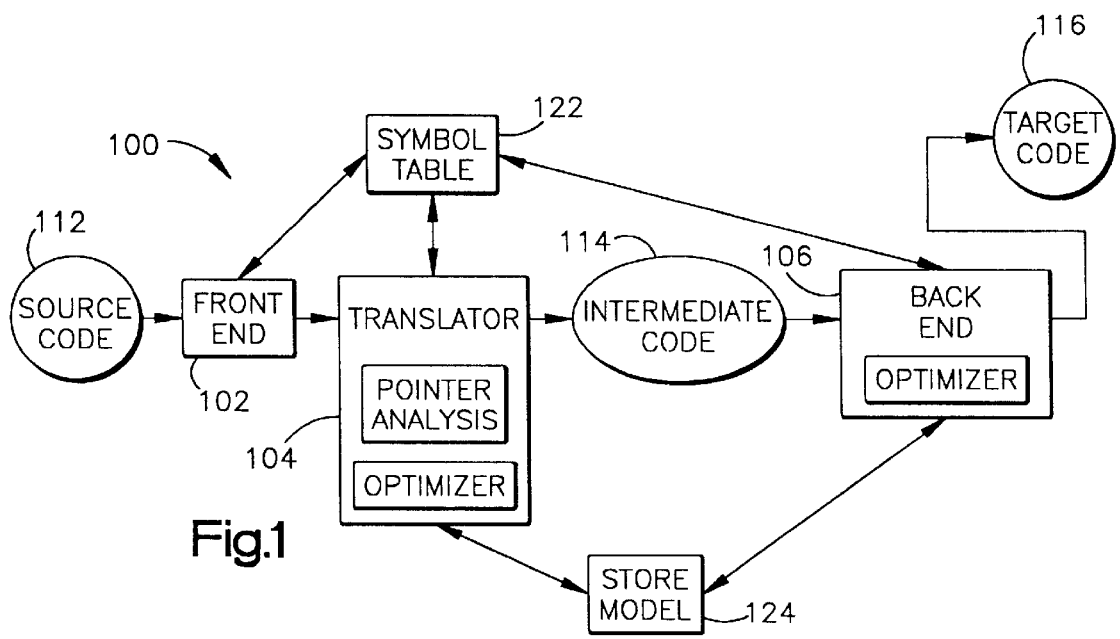
FIG. 1 illustrates for one embodiment a compiler that uses a pointer analysis by type inference for a program with structured memory objects and potentially inconsistent memory object accesses.

A pointer analysis by type inference for a computer program with structured memory objects and potentially inconsistent memory object accesses helps approximate run-time store usage for the program. This pointer analysis may supplement the pointer analysis described in U.S. patent application Ser. No. 08/664,441, filed Jun. 18, 1996, entitled POINTER ANALYSIS BY TYPE INFERENCE COMBINED WITH A NON-POINTER ANALYSIS, by Bjarne Steensgaard. U.S. patent application Ser. No. 08/664,441 is herein incorporated by reference. The pointer analysis may be used for any suitable programming tool or analyzer, such as a suitable program understanding and browsing tool or a suitable program compiler or interpreter for example. FIG. 1 illustrates for one embodiment a program compiler 100 that uses this pointer analysis.

Compiler 100 is implemented in software for execution by a suitable data processing system and comprises a front end 102, a translator 104, and a back end 106. Compiler 100 compiles source code 112 in a suitable source language into target code 116 in a suitable target language. Target code 116 may be executed directly by a suitable data processing system or linked by a suitable linker with other target code for execution by the data processing system.

Front end 102 is source language dependent and performs suitable lexical, syntax, and semantic analyses, for example, on source code 112. Translator 104 generates suitable intermediate code 114 based on the lexical, syntax, and semantic information generated by front end 102. Back end 106 is machine dependent and generates target code 116 based on intermediate code 114. Compiler 100 generates intermediate code 114 to represent source code 112 independent of the source language for source code 112 and independent of the specific machine or data processing system to execute target code 116.

In analyzing source code 112, front end 102 generates a suitable symbol table 122 in the form of a data structure for recording identifiers, such as variables and function names for example, used in source code 112. Suitable attribute information regarding each recorded identifier is also recorded and referenced for front end 102, translator 104, and back end 106.

As illustrated in FIG. 1, translator 104 performs the pointer analysis. Translator 104 evaluates statements referencing memory locations with variables and/or functions, for example, of source code 112 using symbol table 122 to determine store usages for the memory locations. Translator 104 generates a store model 124 in the form of a data structure to represent an approximation of the run-time store usage for source code 112. For another embodiment, front end 102 may perform the pointer analysis to generate store model 124 while parsing source code 112. As illustrated in FIG. 1, translator 104 and/or back end 106 may use store model 124 to help optimize intermediate code 114 and target code 116, respectively, with suitable techniques including, for example, code motion, common subexpression elimination, dead code elimination, peephole optimization, and register allocation techniques.

Source Language

The pointer analysis may be performed for code in any suitable source language that supports, for example, pointers to locations, pointers to functions, dynamic data allocation, data address computation for variables, and/or pointer arithmetic. The source language for one embodiment also supports structured memory objects, such as records or structures for example, and/or inconsistent access of memory objects, such as for unions or through offset location pointers for example. One suitable source language supports one or more of the following forms of abstract syntax statements S:

$$S ::= x =_s y$$
$$x =_s \&y$$
$$x =_s *y$$
$$x =_s \text{allocate}(y)$$
$$*x =_s y$$
$$x =_s op(y_1...y_n)$$
$$x =_s \&y \rightarrow n$$
$$x =_s fun(f_1...f_n) \rightarrow (r_1...r_m)S^*$$
$$x_1...x_m =_{s_1...s_m} p(y_1...y_n)$$

where x, y, f, r, and p range over a set of variable names, n ranges over a set of element names, op ranges over a set of primitive operator names and constants, and S* denotes a sequence of statements. The assignment operator=is annotated with a size s of the representation of the value(s) being assigned.

The $x=_s y$ statement form describes the assignment of the value of the variable y to the variable x.

The $x=_s \&y$ statement form describes the assignment of the address of the variable y to the variable x so the value of the variable x points to y.

The $x=_s *y$ statement form describes the assignment of the content of the location pointed-to by the value of the variable y to the variable x.

The $x=_S$ allocate(y) statement form describes the allocation of a block of memory of size y and the assignment of the address of the allocated block to the variable x so the value of x points to the location for the allocated block.

The $*x=_S y$ statement form describes the assignment of the value of the variable y to the content of the location pointed-to by the value of the variable x.

The $x=_S \text{op}(y_1 \ldots y_n)$ statement form describes the performance of the primitive operation identified by op, such as addition, subtraction, etc., on the values of the operand variables $y_1 \ldots y_n$ and the assignment of the operation result to the variable x. This statement form may describe the assignment of a constant to the variable x, such as for the statement $x=_{<int>} 7$ for example.

The $x=_S \& y->n$ statement form describes the assignment of the address of the element n of the location pointed-to by the value of the variable y to the variable x.

The $x=_S \text{fun}(f_1 \ldots f_n) \to (r_1 \ldots r_m) S^*$ statement form describes the definition of a function or procedure and the assignment of a pointer to the defined function to the variable x. The function is defined with formal parameter variables $f_1 \ldots f_n$, return parameter variables $r_1 \ldots r_m$, and a body represented by the sequence of statements $S^*$. The sequence of statements $S^*$ is executed when the function is called.

The $x_1 \ldots x_m =_{S1 \ldots Sm} p(y_1 \ldots y_n)$ statement form describes the call of a function or procedure pointed-to by the value of the variable p with the values of the parameter variables $y_1 \ldots y_n$ passed as parameters to the called function and with the values of the return parameter variables for the called function respectively assigned to the variables $x_1 \ldots x_m$ after execution of the called function.

For one embodiment, the pointer analysis is performed independent of program control flow, and therefore the source language may support any suitable control flow structures. The pointer analysis for one embodiment is performed independent of type casts and type declarations for the source language. The C programming language is one suitable source language for the pointer analysis.

Types

The pointer analysis uses types to define a store model or storage shape graph representing an approximation of the run-time store usage for a program. A type represents a set of one or more locations and describes the content of those locations. The types define points-to relationships among the sets of locations as determined by the pointer analysis in accordance with typing constraints, and the set of types for a program define the store model for the program. The types used for the pointer analysis are to be distinguished from the types, such as character, integer, long, float, double, etc., associated with type declarations in a program.

To define types for a program in a source language supporting location pointer variables, such as for pointers to locations, dynamic data allocation, and/or data address computation for example, the pointer analysis represents each location representing a variable of the program and each dynamically allocated location of the program with a location type. A location type represents a set of one or more locations and comprises a type representing a set of locations that may be pointed-to by the content of the location(s). The pointer analysis describes each location pointer by a type comprising the type representing the pointed-to location(s).

To define types for a program in a source language supporting structured memory objects, such as for records or structures for example, the pointer analysis represents each location of the program with a location type describing how the represented location(s) are accessed, for example as a unit or as a structured object, and whether the represented location(s) represent an element of a structured object or objects. A location type representing a set of one or more structured objects comprises types describing the location of each element of the represented structured object(s).

To define types for a program in a source language supporting inconsistent access of memory objects, such as for unions or through offset location pointers for example, the pointer analysis represents each location of the program with a location type describing the size of the represented location(s) and whether the represented location(s) are accessed in an inconsistent manner. The pointer analysis describes each location pointer by the type representing the location(s) pointed-to or pointed-into and by an offset describing how the location pointer points to the location(s) relative to the beginning of the location(s).

To define types for a program in a source language supporting function pointer variables, the pointer analysis represents each function of the program with a function type. A function type represents a set of one or more functions and comprises types representing the locations of the formal and return parameter variables for the represented function(s). The pointer analysis represents each location for a function pointer variable with a type comprising a function type representing the function(s) pointed-to by the content of the represented location. The pointer analysis describes each function pointer by the type representing the pointed-to function(s).

For one embodiment, the pointer analysis represents the location representing a variable with a type describing how the variable is accessed, a mapping of element types to describe the location of each element of the variable, the size of the variable, and/or a set of parent types to describe the structured object(s) of which the represented location represents an element. The pointer analysis may also describe the value of the variable with a location pointer type to describe a location pointer and a function type to describe a function pointer. This typing may be described as follows:

| | | |
|---|---|---|
| $\tau ::=$ | $\perp \mid \text{blank}(s, p) \mid \text{simple}(\alpha, \lambda, s, p) \mid$ | |
| | $\text{struct}(m, s, p) \mid \text{object}(\alpha, \lambda, s, p)$ | (Locations) |
| $\alpha ::=$ | $(\tau \times o)$ | (Location Pointers) |
| $o ::=$ | zero \| unknown | (Offsets) |
| $\lambda ::=$ | $\perp \mid \text{lam}(\tau_1 \ldots \tau_n)(\tau_{n+1} \ldots \tau_{n+m})$ | (Functions) |
| $m ::=$ | (element $\to \tau$) mapping | (Elements) |
| $s ::=$ | SIZE \| $\tau$ | (Sizes) |
| $p ::=$ | Powerset $(\tau)$ \| $\tau$ | (Parents) |

That is, the location type $\tau$ represents a set of one or more locations and describes how the represented location(s) are accessed.

The blank location type describes locations whose content are not being used and describes the represented location(s) with a size component s and a parent type component p.

The simple location type describes locations whose content values are used only as a unit. This location type describes the represented location(s) with a size component s and a parent type component p and describes the content of the represented location(s) with a location pointer type component $\alpha$ and a function type component $\lambda$.

The struct location type describes locations whose content values are used only as structured objects and describes the represented location(s) with an element mapping type component m, a size component s, and a parent type component p.

The object location type describes locations whose content values are used in inconsistent manners. This location type describes the represented location(s) with a size component s and a parent type component p and describes the content of the represented location(s) with a location pointer type component a and a function type component $\lambda$.

Location pointer type components a represent location pointers and comprise a location type $\tau$ and an offset type o. The location type $\tau$ represents the location(s) pointed-to or pointed-into by the described location pointer and may be $\perp$ indicating the value described by the location type $\tau$ does not comprise a location pointer. The offset type o indicates how the described location pointer points to the location(s) represented by the location type $\tau$ paired with the offset type o relative to the beginning of the represented location(s).

For one embodiment, the offset type o may be zero indicating the described location pointer is a direct pointer that points to the beginning of the location(s) represented by the location type r paired with the offset type o. The offset type o may also be unknown indicating the described location pointer does not necessarily point to the beginning of the location(s) represented by the location type $\tau$ paired with the offset type o but rather is an offset pointer that may point into or around the represented location(s). The location type $\tau$ paired with an unknown offset type o should be an object location type to describe the inconsistent access of the represented location(s) through the described offset pointer if indeed the described offset pointer is dereferenced. For another embodiment, the offset type o may also be negative or positive indicating an offset direction of the described location pointer relative to the beginning of the location(s) represented by the location type T paired with the offset type o.

Function type components $\lambda$ represent functions and function pointers. The function type component $\lambda$ may comprise types representing the locations of the formal and return parameter variables for the represented functions or may be $\perp$ indicating the value described by the function type component $\lambda$ does not comprise a function pointer.

Element mapping type components m describe mappings of element specifiers to location types representing locations of elements of structured objects. The element specifiers may be numeric or symbolic. Size components s describe sizes of objects and may be numeric or symbolic. The T designation for a size component s is used for types describing memory objects of different sizes and indicates the location type represents the entire memory object(s) or the rest of the memory object(s). The parent type components p describe a set of struct types of which the location type is a component. The T designation for a parent type component p indicates the location type is not a component of any struct types.

The pointer analysis may also describe locations containing constants with types. The pointer analysis for one embodiment may represent locations containing constants with types similarly as locations representing non-pointer variables.

The pointer analysis for one embodiment represents each type with a type variable in the form of a data structure and an associated type constructor in the form of a data structure. Each type variable represents a set of one or more locations, an offset, or a set of one or more functions. For one embodiment, each type variable is implemented as an equivalence class representative (ECR) data structure. The data structure may be Tarjan's fast-union/find data structure, for example.

The type constructor associated with a type variable representing a set of locations comprises other type variables describing the content of the represented location(s). Using the above types, a simple type constructor and an object type constructor comprise a location type component $\tau$, an offset type component o, and a function type component $\lambda$. The location type component $\tau$, offset type component o, and function type component $\lambda$ are each represented with a type variable and an associated type constructor. The struct type constructor comprises location type components $\tau$ for structure elements. Each location type component $\tau$ is represented with a type variable and an associated type constructor.

The type constructor associated with a type variable representing an offset indicates how the location pointer described by the offset points to one or more locations relative to the beginning of the location(s). Using the above types, this type constructor may be either zero or unknown.

The type constructor associated with a type variable representing a set of functions comprises other type variables representing the locations of the formal and return parameter variables for the represented function(s). Using the above types, a lam type constructor comprises a location type component $\tau$ for each formal and return parameter variable of the represented function(s). Each location type component $\tau$ is represented with a type variable and an associated type constructor.

Type Rules

The pointer analysis describes the locations and functions for a program with types so the set of types defining the store model for the program is a valid description of all possible run-time storage configurations for the program. For the program to be typed in this manner, or well-typed, the pointer analysis identifies store usages, including pointer relationships, for the locations and functions for the program and describes the locations and functions for the program with types in accordance with typing constraints based on the store usages.

For a well-typed program, the pointer analysis describes each location with a type describing how the location is accessed or used in the program. The pointer analysis represents pointer locations with a type describing that the represented location(s) are accessed as a unit. The pointer analysis represents locations accessed through address computation of an element of the represented location(s) with a type describing the represented location(s) are accessed as a structured object. If access through a pointer is offset from the beginning of the pointed-to location(s), the pointer analysis represents the pointed-to location(s) with a type describing the inconsistent access.

For assignments of memory objects, the pointer analysis describes the assigned-to location with a type describing how the assigned-from location is accessed as the structure of a location is to reflect the structure of the value stored in the location. The pointer analysis describes the assigned-to location with a type describing an inconsistent access if the assigned-to location is subject to assignment from assigned-from locations described by different access patterns, for example a unit access and a structured object access, or described by an inconsistent access.

Using the above types, the pointer analysis for one embodiment describes the assigned-to location with a type describing the same access pattern as the type representing the assigned-from location or with a type describing an access pattern greater than that for the assigned-from location in accordance with the following hierarchy.

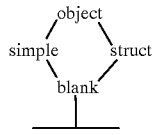

The pointer analysis for a well-typed program also represents each location with a type describing the size of the represented location(s). For assignments of memory objects, the pointer analysis describes the assigned-from and assigned-to locations with types such that the size of the representation of the assigned value is less than or equal to that of the types describing the assigned-from and the assigned-to locations.

Furthermore, the pointer analysis for a well-typed program describes each location pointer for the program with a type comprising the type representing the pointed-to location(s). If a location pointer may point to either one of two locations, the pointer analysis represents the two locations with the same type and describes the location pointer with a type comprising the type representing both locations. If two location pointers may point to the same location, the pointer analysis describes each of the two location pointers with a type comprising the type representing the pointed-to location.

The pointer analysis for a well-typed program likewise describes each function pointer for the program with a type representing the pointed-to function(s). If a function pointer may point to either one of two functions, the pointer analysis represents the two functions with the same type and describes the function pointer with the type representing both functions. If two function pointers may point to the same function, the pointer analysis describes each of the two function pointers with the type representing the pointed-to function.

Using the above types, the pointer analysis for one embodiment describes locations for the assignment of memory objects in accordance with a $\trianglelefteq_s$ constraint described as follows.

$$\tau_2 \trianglelefteq_s \tau_1 \Leftrightarrow \tau_2 = \text{blank}(s_2, p_2) \wedge \tau_1 \neq \perp \wedge$$

$$s \sqsubseteq s_2 \wedge s \sqsubseteq \text{sizeof}(\tau_1)$$

$$\vee \ \tau_1 = \text{simple}(\alpha_1, \lambda_1, s_1, p_1) \wedge$$

$$\tau_2 = \text{simple}(\alpha_2, \lambda_2, s_2, p_2) \wedge$$

$$\alpha_2 \sqsubseteq \alpha_1 \wedge \lambda_2 \sqsubseteq \lambda_1 \wedge s \sqsubseteq s_1 \wedge s \sqsubseteq s_2$$

$$\vee \ \tau_1 = \text{object}(\alpha_2, \lambda_1, s_1, p_1) \wedge$$

$$\tau_2 = \text{simple}(\alpha_2, \lambda_2, s_2, p_2) \wedge$$

$$\alpha_2 \sqsubseteq \alpha_1 \wedge \lambda_2 \sqsubseteq \lambda_1 \wedge s \sqsubseteq s_1 \wedge s \sqsubseteq s_2$$

$$\vee \ \tau_1 = \text{struct}(m_1, s_1, p_1) \wedge$$

$$\tau_2 = \text{struct}(m_2, s_2, p_2) \wedge$$

$$(\forall \ n \in Dom(m_2) : (m_2(n) \trianglelefteq_{s_n} m_1(n),$$

$$\text{where } s_n = \text{sizeof}(m_2(n)))) \wedge$$

$$s \sqsubseteq s_1 \wedge s \sqsubseteq s_2$$

$$\vee \ \tau_1 = \text{object}(\alpha_1, \lambda_1, s_1, p_1) \wedge$$

$$\tau_2 = \text{struct}(m_2, s_2, p_2) \wedge$$

$$(\forall \ n \in Dom(m_2) : (m_2(n) \trianglelefteq_{s_n} \tau_1,$$

-continued $$\text{where } s_n = \text{sizeof}(m_2(n))) \wedge$$

$$s \sqsubseteq s_1 \wedge s \sqsubseteq s_2$$

$$\vee \ \tau_1 = \text{object}(\alpha_1, \lambda_1, s_1, p_1) \wedge$$

$$\tau_2 = \text{object}(\alpha_1, \lambda_2, s_2, p_2) \wedge$$

$$\alpha_2 \sqsubseteq \alpha_1 \wedge \lambda_2 \sqsubseteq \lambda_1 \wedge s \sqsubseteq s_1 \wedge s \sqsubseteq s_2$$

That is, the location type $\tau_2$ representing the assigned-from location and the location type $\tau_1$ representing the assigned-to location satisfy the $\trianglelefteq_s$ constraint if the location type $\tau_1$ describes the same access pattern as the location type $\tau_2$ or describes an access pattern greater than that for the location type $\tau_2$ in the location type hierarchy described above, if the size $s_1$ of the assigned-to location and the size $S_2$ of the assigned-from location are each greater than or equal to the size s of the representation of the assigned value, if the location pointer type $\alpha 2$ describing the content of the assigned-from location and the location pointer type $\alpha_1$ describing the content of the assigned-to location satisfy the $\sqsubseteq$ constraint where the location types $\tau_1$ and $\tau_2$ are either simple or object location types, if the function type $\lambda_2$ describing the content of the assigned-from location and the function type $\lambda_1$ describing the content of the assigned-to location satisfy the $\sqsubseteq$ constraint where the location types $\tau_1$ and $\tau_2$ are either simple or object location types, if the location types $m_2(n)$ and $m_1(n)$ representing the locations representing each respective element n of the assigned-from and assigned-to locations satisfy the $\trianglelefteq_{S_n}$ constraint where the location types $\tau_1$ and $\tau_2$ are each struct location types, and if each location type $m_2(n)$ representing the location representing each element n of the assigned-from location and the location type $\tau_1$ satisfy the $\trianglelefteq_{S_n}$ constraint where the location types $\tau_1$ and $\tau_2$ are object and struct location types, respectively.

The $\sqsubseteq$ constraint for one embodiment is described as follows.

$$\alpha_2 \sqsubseteq \alpha_1 \Leftrightarrow (\tau_2 \times o_2) \sqsubseteq (\tau_1 \times o_1)$$

$$(\tau_2 \times o_2) \sqsubseteq (\tau_1 \times o_1) \Leftrightarrow (\tau_2 = \perp) \vee ((\tau_2 \sqsubseteq \tau_1) \wedge (o_2 \sqsubseteq o_1))$$

$$\tau_2 \sqsubseteq \tau_1 \Leftrightarrow (\tau_2 = \perp) \vee (\tau_1 = \tau_2)$$

$$o_2 \sqsubseteq o_1 \Leftrightarrow (o_2 = \text{zero}) \vee (o_1 = o_2)$$

$$\lambda_2 \sqsubseteq \lambda_1 \Leftrightarrow (\lambda_2 = \perp) \vee (\lambda_1 = \lambda_2)$$

$$s_2 \sqsubseteq s_1 \Leftrightarrow (s_1 = s_2) \vee (s_1 = \top)$$

That is, the constraint $\alpha_2 \sqsubseteq \alpha_1$ or $(\tau_2 \times o_2) \sqsubseteq (\tau_1 \times o_1)$ is g;A satisfied if the location type $\tau_2$ is $\perp$ or if both constraints $\tau_2 \sqsubseteq \tau_1$ and $o_2 \sqsubseteq o_z$ are satisfied. The constraint $\tau_2 \sqsubseteq \tau_1$ is satisfied if the location type $\tau_2$ is $\perp$ or if the location type $\tau_1$ is equal to the location type $\tau_2$. The constraint $o_2 \sqsubseteq o_1$ is satisfied if the offset type $o_2$ is zero or if the offset type $o_1$ is equal to the offset type $o_2$. The constraint $\lambda_2 \sqsubseteq \lambda_1$ is satisfied if the function type $\lambda_2$ is $\perp$ or if the function type $\lambda_1$ is equal to the function type $\lambda_2$. The constraint $s_2 \sqsubseteq s_1$ is satisfied if the size $s_1$ is equal to the size $s_2$ or if the size $s_1$ is $\top$ for one embodiment using symbolic sizes with no ordering relation. For another embodiment using numeric sizes, the constraint $s_2 \sqsubseteq s_1$ is satisfied if the size $s_1$ is greater than or equal to the size $s_2$ or if the size $s_1$ is $\top$.

The location pointer type $\alpha_2$ or $\tau_2 \times o_2$ describing the content of the assigned-from location and the location pointer. type $\alpha_1$ or $\tau_1 \times o_1$ describing the content of the assigned-to location therefore satisfy the $\sqsubseteq$ constraint if the content of the assigned-from location does not comprise a location pointer. If the content of the assigned-from location does comprise a potential location pointer, the location pointer types $\tau_2 \times o_2$ and $\tau_1 \times o_1$ satisfy the $\sqsubseteq$ constraint (1) if the location types $\tau_1$ and $\tau_2$ are the same and (2) if the offset type $o_2$ indicates the content of the assigned-from location does not comprise an offset pointer or if the offset types $o_1$ and $o_2$ indicate the content of both the assigned-from and assigned-to locations may comprise offset pointers.

The function type $\lambda_2$ describing the content of the assigned-from location and the function type $\lambda_1$ describing the content of fizz the assigned-to location therefore satisfy the $\sqsubseteq$ constraint if the content of the assigned-from location does not comprise a function pointer. If the content of the assigned-from location does comprise a potential function pointer, the function types $\lambda_2$ and $\lambda_1$ satisfy the $\sqsubseteq$ constraint if the function types $\lambda_1$ and $\lambda_2$ are the same.

The pointer analysis applies the typing constraints for a well-typed program based on store usages for the locations and functions for the program. For one embodiment, the pointer analysis identifies store usages based on the form of each program statement referencing one or more locations or functions. The pointer analysis describes locations and functions affected by the store usages with types in accordance with a type rule specifying the typing constraints for the statement form so the description of the store as defined by the store model is valid both before and after execution of the statement. If each program statement referencing one or more locations or functions is typed in this manner, or well-typed, the program is well-typed. For one embodiment, the type rules for well-typed statements S are as follows.

For a statement in the form $x=_s y$, the value of the variable y will be assigned to the variable x after execution of the statement. The value of the variable x and the value of the variable y may each comprise a pointer pointing to the same location or function if the value of the variable y may comprise a pointer.

Using the above types, the type rule for this statement form is described as:

$$\frac{A \vdash x : \tau_1 \qquad A \vdash y : \tau_2 \qquad \tau_2 \trianglelefteq_s \tau_1}{A \vdash welltyped(x =_s y)}$$

That is, a statement in the form $x=_s y$ is well-typed under the typing environment A if the location type $\tau_2$ representing the location representing the variable y and the location type $\tau_1$ representing the location representing the variable x satisfy the constraint $\tau_2 \trianglelefteq_s \tau_1$.

The typing environment A associates all variables for a program with a type and represents the store model for the program. A$\bullet$x: $\tau$ holds true if and only if the variable x is associated with the type $\tau$ in the typing environment A.

For a statement in the form $x=_x \&y$, the value of the variable x will be a pointer to the location representing the variable y after execution of the statement.

Using the above types, the type rule for this statement form is described as:

$$\frac{A \vdash : sim/obj(\alpha_1, \lambda_1, s_1, p_1) \qquad A \vdash y : \tau_2 \qquad \alpha_1 = (\tau_1 \times o_1) \qquad s \sqsubseteq s_1 \qquad \tau_2 \sqsubseteq \tau_1}{A \vdash welltyped(x =_s \&y)}$$

That is, a statement in the form $x=_s \&y$ is well-typed under the typing environment A if the location type representing the location representing the variable x is a simple or object location type, if the location type $\tau_2$ representing the location representing the variable y and the location type component $\tau_1$ describing the value of the variable x satisfy the constraint $\tau_2 \sqsubseteq \tau_1$, and if the size $s_1$ of the location representing the variable x is greater than or equal to the size s of the representation of the assigned value.

For a statement in the form $x=_x *y$, the content of the location(s) pointed-to by the value of the variable y will be assigned to the variable x after execution of the statement. If the value of the variable y is an offset pointer, the pointed-to location(s) are accessed inconsistently. The value of the variable x and the content of the location(s) pointed-to by the value of the variable y may each comprise a pointer pointing to the same location or function if the content of the location(s) pointed-to by the value of the variable y may comprise a pointer.

Using the above types, the type rule for this statement form is described as:

$$\frac{A \vdash x : \tau_1 \qquad A \vdash y : sim/obj(\alpha_2, \lambda_2, s_2, p_2) \qquad \alpha_2 = (\tau_2 \times zero) \qquad sizeof(void*) \sqsubseteq s_2 \qquad \tau_2 \trianglelefteq_s \tau_1}{A \vdash welltyped(x =_s *y)}$$

$$\frac{A \vdash x : \tau_1 \qquad A \vdash y : sim/obj(\alpha_2, \lambda_2, s_2, p_2) \qquad \alpha_2 = (\tau_2 \times unknown) \qquad \tau_2 = object(\alpha_3, \lambda_3, s_3, p_3) \qquad sizeof(void*) \sqsubseteq s_2 \qquad \tau_2 \trianglelefteq_s \tau_1}{A \vdash welltyped(x =_s *y)}$$

That is, a statement in the form $x=_x *y$ is well-typed under the typing environment A if the location type representing the location representing the variable y is a simple or object location type, if the location type component $\tau_2$ describing the value of the variable y and the location type $\tau_1$ representing the location representing the variable x satisfy the constraint $\tau_2 \trianglelefteq_s \tau_1$, and if the size $s_2$ of the location representing the variable y is greater than or equal to the size of a pointer, where the location type component $\tau_2$ is an object location type if the offset type component describing the value of the variable y is unknown indicating the value of the variable y comprises an offset pointer.

For a statement in the form $x=_x allocate(y)$, the value of the variable x will be a pointer to the allocated memory block after execution of the statement.

Using the above types, the type rule for this statement form is described as:

$$A \vdash y : sim/obj(\alpha_1, \lambda_1, s_1, p_1)$$

$$\alpha_1 = (\tau_1 \times o_1)$$

$$\text{blank}(\tau, \emptyset) \sqsubseteq \tau_1$$

$$s \sqsubseteq s_1$$

$$\overline{A \vdash welltyped(x =_s \text{allocate}(y))}$$

That is, a statement in the form $x=_s$ allocate(y) is well-typed under the typing environment A if the location type representing the location representing the variable x is a simple or object location type, if the location type component $\tau_1$ describing the value of the variable x is a non-$\bot$ location type of unknown size indicating the value of the variable x is a location pointer, and if the size $s_1$ of the location representing the variable x is greater than or equal to the size s of the representation of the assigned value.

For a statement in the form $*x=_s y$, the value of the variable y will be assigned to be the content of the location (s) pointed-to by the value of the variable x after execution of the statement. If the value of the variable x is an offset pointer, the pointed-to location(s) are accessed inconsistently. The content of the location(s) pointed-to by the value of the variable x and the value of the variable y may each comprise a pointer pointing to the same location or function if the value of the variable y may comprise a pointer.

Using the above types, the type rule for this statement form is described as:

$$A \vdash x : sim/obj\ (\alpha_1, \lambda_1, s_1, p_1)$$

$$A \vdash y : \tau_2$$

$$\alpha_1 = (\tau_1\ x\ \text{zero})$$

$$\text{sizeof}(\text{void}*) \sqsubseteq s_1$$

$$\tau_2 \leq_s \tau_1$$

$$\overline{A \vdash welltyped\ (*x =_s\ y)}$$

$$A \vdash x : sim/obj\ (\alpha_1, \lambda_1, s_1, p_1)$$

$$A \vdash y : \tau_2$$

$$\alpha_1 = (\tau_1\ x\ \text{unknown})$$

$$\tau_1 = \text{object}\ (\alpha_3, \lambda_3, s_3, p_3)$$

$$\text{sizeof}\ (\text{void}*) \sqsubseteq s_1$$

$$\tau_2 \leq_s \tau_1$$

$$\overline{A \vdash welltyped\ (*x =_s\ y)}$$

That is, a statement in the form $*x=_s y$ is well-typed under the typing environment A if the location type representing the location representing the variable x is a simple or object location type, if the location type $\tau_2$ representing the location representing the variable y and the location type component $\tau_1$ describing the value of the variable x satisfy the constraint $\tau_2 \leq_s \tau_1$, and if the size $s_1$ of the location representing the variable x is greater than or equal to the size of a pointer, where the location type component $\tau_1$ is an object location type if the offset type component describing the value of the variable x is unknown indicating the value of the variable x comprises an offset pointer.

For a statement in the form $x=_s op(y_1 \ldots y_n)$, for one embodiment, the value of the variable x and the value of any one operand variable $y_i$ of the operand variables $y_1 \ldots y_n$ may each comprise a pointer pointing to the same location or function if the value of the variable $y_i$ may comprise a pointer.

Using the above types, the type rule for this statement form is described as:

$$A \vdash x : \tau$$

$$A \vdash y_i : \tau_i$$

$$\forall i \in [1 \ldots n] : \tau_i \leq_s \tau$$

$$\tau = sim/obj\ (\alpha', \lambda', s', p')$$

$$\alpha' = (\tau'\ x\ \text{unknown})$$

$$\overline{A \vdash welltyped\ (x =_s\ op\ (y_1 \ldots y_n))}$$

That is, a statement in the form $x=_s op(y_1 \ldots y_n)$ is well-typed under the typing environment A if the location type $\tau_i$ representing the location representing each one $y_i$ of the operand variables $y_1 \ldots y_n$ and the location type $\tau$ representing the location representing the variable x satisfy the constraint $\tau_i \leq_s \tau$ and if the location type $\tau$ is a simple or object location type comprising an unknown offset type component indicating the value of the variable x comprises an offset pointer if indeed the value of the variable x does comprise a pointer.

The type rule for a statement in the form $x=_x op(y_1 \ldots y_n)$, for other embodiments, may depend on the operation identified by op. Where the operation may return a structured value, the variable x may be described with a struct location type. For some operations, such as a < or $\neq$ comparison operation for example, the result of the operation and therefore the value assigned to the variable x will not comprise a pointer regardless of whether the value of any one of the operand variables $y_1 \ldots y_n$ may comprise a pointer. The value of the variable x may therefore be described with a type different from the type describing the value of any one of the operand variables $y_1 \ldots y_n$ while maintaining the well-typedness of the statement. For embodiments where the source language does not support pointer arithmetic, the value of the variable x may be described with a type different from the type describing the value of any one of the operand variables $y_1 \ldots y_n$ while maintaining the well-typedness of the statement.

For a statement in the form $x=_s \&y->n$, the value of the variable x will be a pointer to the location representing the element n of the location pointed-to by the value of the variable y after execution of the statement.

Using the above types, the type rule for this statement form is described as:

$$A \vdash x : sim/obj\ (\alpha_1, \lambda_1, s_1, p_1)$$

$$A \vdash y : sim/obj\ (\alpha_2, \lambda_2, s_2, p_2)$$

$$\alpha_1 = (\tau_1\ x\ o_1)$$

$$\alpha_2 = (\tau_2\ x\ \text{zero})$$

$$\tau_2 = \text{struct}\ (m_3, s_3, p_3)$$

$$\text{compatible}\ (n, m_3)$$

$$s \sqsubseteq s_1$$

$$\text{sizeof}\ (\text{void}*) \sqsubseteq s_2$$

$$m_3(n) \sqsubseteq \tau_1$$

$$\overline{A \vdash welltyped\ (x =_s\ \&y - > n)}$$

$$A \vdash x : \text{sim}/\text{obj} \ (\alpha_1, \lambda_1, s_1, p_1)$$

$$A \vdash y : \text{sim}/\text{obj} \ (\alpha_2, \lambda_2, s_2, p_2)$$

$$\alpha_1 = (\tau_1 \ x \ \text{unknown})$$

$$\alpha_2 = (\tau_2 \ x \ o_2)$$

$$\tau_2 = \text{object} \ (\alpha_3, \lambda_3, s_3, p_3)$$

$$s \sqsubseteq s_1$$

$$\text{sizeof} \ (\text{void}*) \sqsubseteq s_2$$

$$\tau_2 \sqsubseteq \tau_1$$

$$\overline{A \vdash \text{welltyped} \ (x =_s \&y - > n)}$$

That is, a statement in the form $x =_x \&y \rightarrow n$ is well-typed under the typing environment A if the location types representing the locations representing the variables x and y are each a simple or object location type, if the size $s_1$ of the location representing the variable x is greater than or equal to the size s of the representation of the assigned value, if the size $s_2$ of the location representing the variable y is greater than or equal to the size of a pointer, and if the location type $m_3(n)$ representing the location representing the element n and the location type component $\tau_1$ describing the value of the variable x satisfy the constraint $m_3(n) \sqsubseteq \tau_1$ where the location type component $\tau_2$ describing the value of the variable y is a struct location type and the offset type component describing the value of the variable y is zero, where compatible $(n, m_3)$ is a predicate stating that the mapping $m_3$ describes a structure having a prefix matching that of the structure being accessed up to and including the element n. Where the location type component $\tau_2$ is not a struct location type or the offset type component describing the value of the variable y is not zero, a statement in this form is well-typed under the typing environment A if the location type component $\tau_2$ describing the value of the variable y and the location type component $\tau_1$ describing the value of the variable x satisfy the constraint $\tau_2 \sqsubseteq \tau_1$, if the location type component $\tau_2$ is an object location type, and if the offset type component describing the value of the variable x is unknown.

For a statement in the form $x =_s \text{fun}(f_1 \ldots f_n) \rightarrow (r_1 \ldots r_m) \ S*$, the value of the variable x will be a pointer to a function with formal and return parameter variables $f_1 \ldots f_n$ and $r_1 \ldots r_m$ after execution of the statement.

Using the above types, the type rule for this statement form is described as:

$$A \vdash x : \text{sim}/\text{obj} \ (\alpha_0, \lambda_0, s_0, p_0)$$

$$\lambda_0 = lam \ (\tau_1 \ldots \tau_n)(\tau_{n+1} \ldots \tau_{n+m})$$

$$A \vdash f_i : \tau_i$$

$$A \vdash r_j : \tau_{n+j}$$

$$s_i = \text{sizeof} \ (f_i)$$

$$s_{n+j} = \text{sizeof} \ (r_j)$$

$$s \sqsubseteq s_0$$

$$\forall i \in [1 \ldots n] : \tau_i \trianglelefteq_{Si} \tau_i'$$

$$\forall j \in [1 \ldots m] : \tau_{n+j} \trianglelefteq_{Sn+j} \tau_{n+j}'$$

$$\forall S \in S^* : A \vdash \text{welltyped}(S)$$

$$\overline{A \vdash \text{welltyped} \ (x =_s \text{fun} \ (f_1 \ldots f_n) \rightarrow (r_1 \ldots r_n) \rightarrow (r_1 \ldots r_m)}$$

That is, a statement in the form $x =_s \text{fun}(f_1 \ldots f_n) \rightarrow (r_1 \ldots r_m) \ S*$ is well-typed under the typing environment A if the location type representing the location representing the variable x is a simple or object location type, if the size $s_0$ of the location representing the variable x is greater than or equal to the size s of the representation of the assigned value, if the location type $\tau_i$ representing the location representing each one $f_i$ of the variables $f_1 \ldots f_n$ and the corresponding location type $\tau_i$ representing the location for each one of the formal parameter variables for all the functions potentially pointed-to by the value of the variable x satisfy the constraint $\tau_i \trianglerighteq_{Si} \tau_i'$ where $s_i = \text{sizeof} \ (f_i)$, if the location type $\tau_{n+j}'$ representing the location representing each one $r_j$ of the variables $r_1 \ldots r_m$ and the corresponding location type $\tau_{n+j}$ representing the location for each one of the return parameter variables for all the functions potentially pointed-to by the value of the variable x satisfy the constraint $\tau_{n+j} \trianglerighteq_{Sn+j} \tau_{n+j}'$ where $S_{n+j} = \text{sizeof}(r_j)$, and if each statement S of the sequence of statements S* is well-typed under the typing environment A.

For a statement in the form $x_1 \ldots x_m =_{Sn+1} \ldots _{Sn+m} \ p(y_1 \ldots y_n)$, the values of the variables $y_1 \ldots y_n$ are assigned to the formal parameter variables for the function or procedure pointed-to by the value of the variable p before execution of the function, and the values of the return parameter variables for the called function are assigned to the variables $x_1 \ldots x_m$ after execution of the called function. The contents of the assigned-from and assigned-to variables may each comprise a pointer pointing to the same location or function if the assigned-from variable may comprise a pointer.

Using the above types, the type rule for this statement form is described as:

$$A \vdash p : \text{sim}/\text{obj} \ (\alpha_0, \lambda_0, s_0, p_0)$$

$$\text{sizeof} \ (\text{void}(*) \ ()) \sqsubseteq s_0$$

$$\lambda_0 = lam \ (\tau_1 \ldots \tau_n)(\tau_{n+1} \ldots \tau_{n+m})$$

$$A \vdash x_j : \tau_{n+j}'$$

$$A \vdash y_i : \tau_i'$$

$$s_i = \text{sizeof} \ (y_i)$$

$$\forall i \in [1 \ldots n] : \tau_i' \trianglelefteq_{Si} \tau_i$$

$$\forall j \in [1 \ldots m] : \tau_{n+j} \trianglelefteq_{Sn+j} \tau_{n+j}'$$

$$\overline{A \vdash \text{welltyped} \ (x_1 \ldots x_m =_{Sn+1 \ldots Sn+m} \ p(y_1 \ldots y_n))}$$

That is, a statement in the form $x_1 \ldots x_m =_{Sn+1} \ldots _{Sn+m} \ p(y_1 \ldots y_n)$ is well-typed under the typing environment A if the location type representing the location representing the variable p is a simple or object location type, if the size $s_0$ of the location representing the variable p is greater than or equal to the size of a pointer to a function, if the location type $\tau_i'^{40}$ representing the location representing each one $y_i$ of the variables $y_1 \ldots y_n$ and the corresponding location type $\tau_i$ representing the location for each one of the formal parameter variables for the potentially called functions pointed-to by the value of the variable p satisfy the constraint $\tau_i'^{40} \trianglelefteq_s \tau_i$ where $s_i = \text{sizeof} \ (y_i)$, and if the location type $\tau_{n+j}'$ representing the location representing each one $x_j$ of the variables $x_1 \ldots x_m$ and the corresponding location type $\tau_{n+j}$ representing the location for each one of the return parameter variables for the potentially called functions pointed-to by the value of the variable p satisfy the constraint $\tau_{n+j} \trianglerighteq_{Sn+j} \tau_{n+j}'$.

For another embodiment using the above types, the pointer analysis describes locations for the assignment of memory objects in accordance with a $\bowtie_s$ constraint, in lieu of the $\trianglelefteq_s$ constraint, described as follows.

$$\tau_2 \bowtie_s \tau_1 \Leftrightarrow \tau_1 = \text{blank}\ (s_1, p_1) \wedge$$
$$\tau_2 = \text{blank}\ (s_2, p_2) \wedge$$
$$s \sqsubseteq s_1 \wedge s \sqsubseteq s_2$$
$$\vee\ \tau_1 = \text{simple}\ (\alpha_1, \lambda_1, s_1, p_1) \wedge$$
$$\tau_2 = \text{simple}\ (\alpha_2, \lambda_2, s_2, p_2) \wedge$$
$$\alpha_1 = \alpha_2 \wedge \lambda_1 = \lambda_2 \wedge s \sqsubseteq s_1 \wedge s \sqsubseteq s_2$$
$$\vee\ \tau_1 = \text{struct}\ (m_1, s_1, p_1) \wedge$$
$$\tau_2 = \text{struct}\ (m_2, s_2, p_2) \wedge$$
$$\text{Dom}(m_1) = \text{Dom}(m_2) \wedge$$

$$(\forall\ n \in \text{Dom}(m_2) : (m_2(n)\ \bowtie_{s_n}\ m_1(n), \text{where}\ s_n = \text{sizeof}\ (m_2(n)))) \wedge$$

$$s \sqsubseteq s_1 \wedge s \sqsubseteq s_2$$
$$\vee\ \tau_1 = \text{object}\ (\alpha_1, \lambda_1, s_1, p_1) \wedge$$
$$\tau_2 = \text{object}\ (\alpha_2, \lambda_2, s_2, p_2) \wedge$$
$$\alpha_1 = \alpha_2 \wedge \lambda_1 = \lambda_2 \wedge s \sqsubseteq s_1 \wedge s \sqsubseteq s_2$$

That is, the location type $T_2$ representing the assigned-from location and the location type $T_1$ representing the assigned-to location satisfy the $\bowtie_s$ constraint if the location type $T_1$ describes the same access pattern as the location type $T_2$, if the size $s_1$ of the assigned-to location and the size $s_2$ of the assigned-from location are each greater than or equal to the size s of the representation of the assigned value, if the location pointer type $\alpha_2$ describing the content of the assigned-from location is the same as the location pointer type $\alpha_1$ describing the content of the assigned-to location where the location types $T_1$ and $T_2$ are each simple location types or are each object location types, if the function type $\lambda_2$ describing the content of the assigned-from location is the same as the function type $\lambda_1$ describing the content of the assigned-to location where the location types $\tau_1$ and $\tau_2$ are each simple location types or are each object location types, if the location types $m_2(n)$ and $m_1(n)$ representing the locations representing each respective element n of the assigned-from and assigned-to locations satisfy the $\bowtie_{s_n}$ constraint where the location types $\tau_1$ and $\tau_2$ are each struct location types and where the assigned-from and assigned-to locations have the same domain of elements.

Analysis

Figure 2:
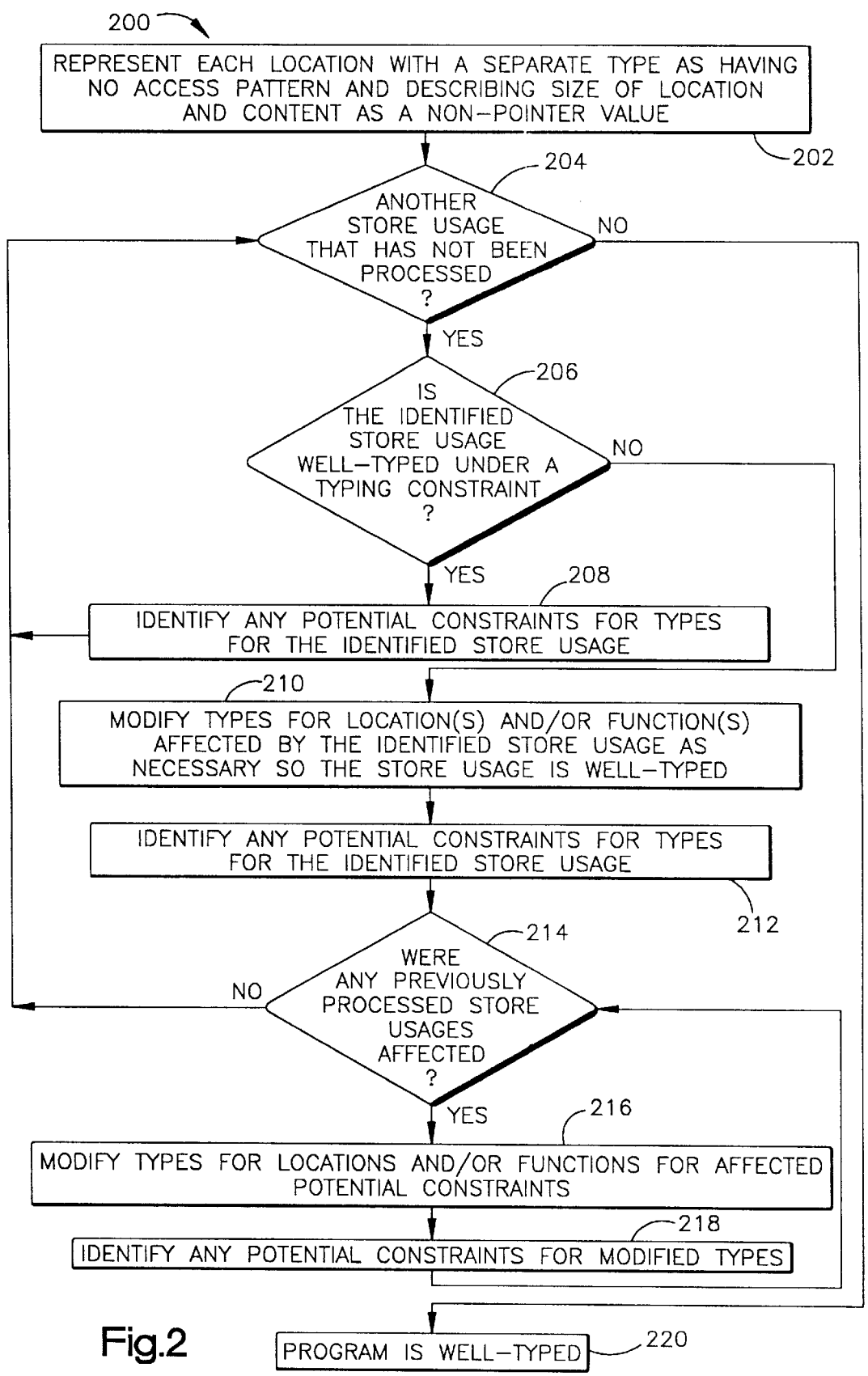
FIG. 2 illustrates for one embodiment a flow diagram for performing a pointer analysis by type inference for a program with structured memory objects and potentially inconsistent memory object accesses.

FIG. 2 illustrates for one embodiment a flow diagram 200 for performing a pointer analysis by type inference for a program with structured memory objects and potentially inconsistent memory object accesses.

For step 202 of FIG. 2, the analysis represents each location for the program with a separate type as having no access pattern. Each type describes the size of the represented location and describes the content of the represented location as a non-pointer value. The analysis for one embodiment initially describes the value of each variable for the program with a blank (s,Ø) location type, where the size component s is the size of the representation of the variable. By representing each variable of the program with a type, the analysis defines a typing environment for the program. The analysis for one embodiment identifies each location for the program using a symbol table having recorded identifiers for each variable for the program.

For step 204, the analysis identifies a store usage that is described by the program and has not been processed by the analysis. The analysis for one embodiment identifies the form of a statement of the program to identify the store usage or usages described by the statement.

If the analysis identifies a store usage that has not been processed, the analysis for step 206 determines whether the location(s) and/or function(s) affected by the identified store usage are well-typed for the current typing environment under a typing constraint. For one embodiment, the analysis determines whether the program statement describing the identified store usage(s) is well-typed for the current typing environment in accordance with a type rule specifying the typing constraint for the form of the statement.

If the analysis determines an identified store usage is well-typed, the analysis for step 208 identifies any potential constraints for types for the identified store usage and proceeds to process another store usage for step 204. The analysis identifies any potential constraints in case the analysis determines in processing other store usages that the modification of a type in a subsequent typing environment may impose a constraint on another type.

For one embodiment, the analysis identifies access pattern relationships for types in case a modification of the description of the access pattern for one type may warrant the modification of the access pattern description for another type. The analysis also identifies pointer offset relationships for types in case a modification of a type to describe an offset pointer warrants the modification of another type to describe an offset pointer and/or the modification of another type to describe the pointed-to location as being accessed in an inconsistent manner. For embodiments combining the points-to analysis with a non-pointer analysis as described in U.S. patent application Ser. No. 08/664,441, for example, the analysis further identifies potential points-to relationships for types representing only non-pointer values in case a modification of a type to describe a pointer value warrants the modification of another type to describe the pointed-to location(s).

The analysis for one embodiment identifies each potential constraint in a separate pending set associated with the type the modification of which may impose the potential constraint. Each pending set for one embodiment is a pending bag implemented as a binary tree data structure. For another embodiment, all potential constraints identified for the program may be identified in a single pending set.

If the analysis for step 206 determines the identified store usage is not well-typed for the current typing environment under the typing constraint, the analysis for step 210 modifies types for location(s) and/or function(s) affected by the identified store usage as necessary so the store usage is well-typed under the typing constraint. For one embodiment, the analysis modifies types in accordance with a type rule specifying the typing constraint for the form of the program statement describing the identified store usage.

The analysis for one embodiment modifies types by modifying access pattern descriptions for types. The analysis for one embodiment modifies access pattern descriptions for types by promoting a location type to a greater location type in the location type hierarchy described above. A $\perp$ location type may be promoted to a blank, simple, struct, or object location type. A blank location type may be promoted to a simple, struct, or object location type. A simple or struct location type may be promoted to an object location type. The analysis for one embodiment also modifies types by expanding the sizes of types to accommodate the sizes of the representations of assigned values. The analysis for one embodiment further modifies types by unifying types or setting types.

The analysis for step 212 identifies any potential constraints for types for the identified store usage similarly as for step 208 in case the analysis determines in processing other store usages that the modification of a type in a subsequent typing environment may impose a constraint on another type.

For step 214, the analysis determines whether any previously processed store usages were affected by the modification of types for step 210. The analysis determines whether any potential constraints identified for steps 208, 212, and 218 were affected by the modification of types for step 210.

For one embodiment, the modification of the description of the access pattern for one type may warrant the modification of the access pattern description for another type for an identified access pattern relationship. The modification of a type to describe an offset pointer may warrant the modification of another type to describe an offset pointer and/or the modification of another type to describe the pointed-to location as being accessed in an inconsistent manner for identified pointer offset relationships. For embodiments using a non-pointer analysis, the modification of a type to describe a pointer value may warrant the modification of another type to describe the pointed-to location for an identified potential points-to relationship.

For one embodiment, the affected potential constraints are determined by the pending set associated with the type modified for step 210. If any previously processed store usages were affected as determined for step 214, the analysis for step 216 modifies types in accordance with the affected potential constraints and for step 218 identifies any potential constraints for the modified types similarly as for steps 208 and 212. The analysis repeats steps 214 through 218 as potential constraints are imposed by the modification of types for step 216.

If the analysis determines for step 214 that no previously processed store usages were affected by steps 210 or 216, the analysis proceeds to process another store usage for steps 204 through 218 until the analysis determines for step 204 that all store usages for the program have been processed. The analysis for one embodiment determines whether the last statement referencing a location and/or function for the program has been identified. When the analysis has processed all store usages for the program, the program is well-typed for step 220. The resulting set of types define the store model for the program and is a valid description of all possible run-time storage configurations for the program.

For one embodiment, the analysis for FIG. 2 may process each store usage described by the program in any order independent of program control flow as defined by the control flow structures for the program. The analysis processes each store usage for the program only one time.

The analysis for steps 204 through 218 is implemented with the above type rules for one embodiment in accordance with the representative pseudo-code of Appendix A for each identified program statement form. The functions for the pseudo-code of Appendix A are implemented for one embodiment in accordance with the representative pseudo-code of Appendix B.

Types for Sample Programs

Figure 3:
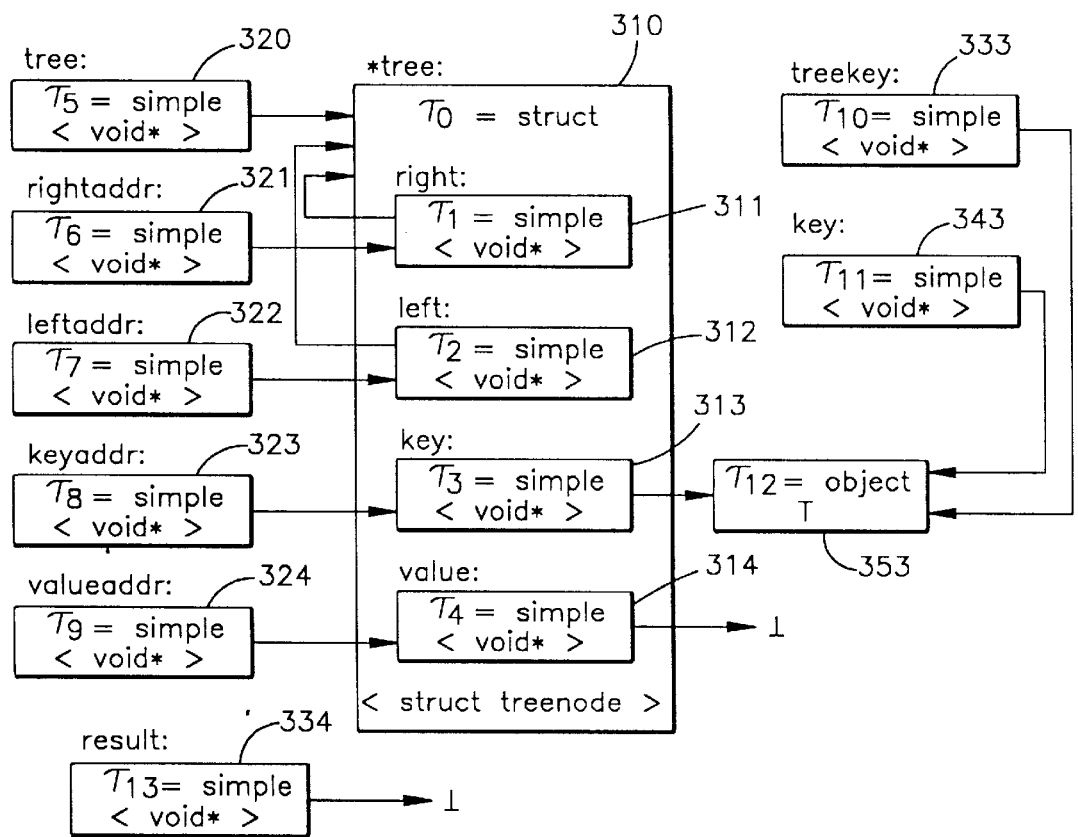
FIG. 3 illustrates for one embodiment graphical representations of types for a sample program fragment.

FIG. 3 illustrates for one embodiment graphical representations for types describing locations for the following sample pseudo-code program fragment.

```
struct treenode (right, left, key, value)
lookup =<void*> fun(tree, key)→(result)
    while (tree)
        keyaddr =<void*> &tree->key;
        treekey =<void*> *keyaddr;
        rel =<char> strcmp(key, treekey)
        if (rel > 0) then
            rightaddr =<void*> &tree->right
            tree =<struct treenode> *rightaddr
        elseif (rel < 0) then
            leftaddr =<void*> &tree->left
            tree =<struct treenode> *leftaddr
        else
            valueaddr =<void*> &tree->value
            result =<void*> *valueaddr
            return
        fi
    endwhile
```

This program fragment may be implemented in the C programming language as follows.

```
typedef struct treenode {
    struct treenode *right, *left;
    char *key, *value;
} treenode;
char *lookup (treenode *tree, char *key)
{
    int rel;
    while (tree) {
        rel = strcmp(key, tree->key);
        if (rel > 0)
            tree = tree->right;
        else if (rel < 0)
            tree = tree->left;
        else
            return tree->value;
    }
}
```

This sample program fragment implements a lookup function for operation with a binary tree data structure. Each node of the binary tree has a key and a value data field. Each node also has a left subtree containing all keys of lexicographic lower ordering than the node's key and a right subtree containing all keys of lexicographic higher ordering than the node's key.

Using the above types, the pointer analysis represents the locations representing *tree, tree->right, tree->left, tree->key, tree->value, tree, rightaddr, leftaddr, keyaddr, valueaddr, treekey, result, and key with types 310, 311, 312, 313, 314, 320, 321, 322, 323, 324, 333, 334, and 343, respectively, as illustrated in FIG. 3. Type 353 represents the location(s) pointed-to by the content of the location represented by types 313, 333, and 343. Types 310–314, 320–324, 333–334, 343, and 353 describe these locations as follows.

| | |
|---|---|
| *tree: | $\tau_0$ = struct([right→$\tau_1$,left→$\tau_2$,key→$\tau_3$,value→$\tau_4$], <struct treenode>,$\phi$) |
| tree->right: | $\tau_1$ = simple(($\tau_0$ × zero),⊥,<void*>,{$\tau_0$}) |
| tree->left: | $\tau_2$ = simple(($\tau_0$ × zero),⊥,<void*>,{$\tau_0$}) |
| tree->key: | $\tau_3$ = simple(($\tau_{12}$ × zero),⊥,<void*>,{$\tau_0$}) |
| tree->value: | $\tau_4$ = simple((⊥ × zero),⊥,<void*>,{$\tau_0$}) |
| tree: | $\tau_5$ = simple(($\tau_0$ × zero),⊥,<void*>,$\phi$) |
| rightaddr: | $\tau_6$ = simple(($\tau_1$ × zero),⊥,<void*>,$\phi$) |
| leftaddr: | $\tau_7$ = simple(($\tau_2$ × zero),⊥,<void*>,$\phi$) |
| keyaddr: | $\tau_8$ = simple(($\tau_3$ × zero),⊥,<void*>,$\phi$) |
| valueaddr: | $\tau_9$ = simple(($\tau_4$ × zero),⊥,<void*>,$\phi$) |
| treekey: | $\tau_{10}$ = simple(($\tau_{12}$ × zero),⊥,<void*>,$\phi$) |
| key: | $\tau_{11}$ = simple(($\tau_{12}$ × zero),⊥,<void*>,$\phi$) |
| | $\tau_{12}$ = object((⊥ × zero),⊥,T,$\phi$) |
| result: | $\tau_{13}$ = simple((⊥ × zero),⊥,<void*>,$\phi$) |

Figure 4A:
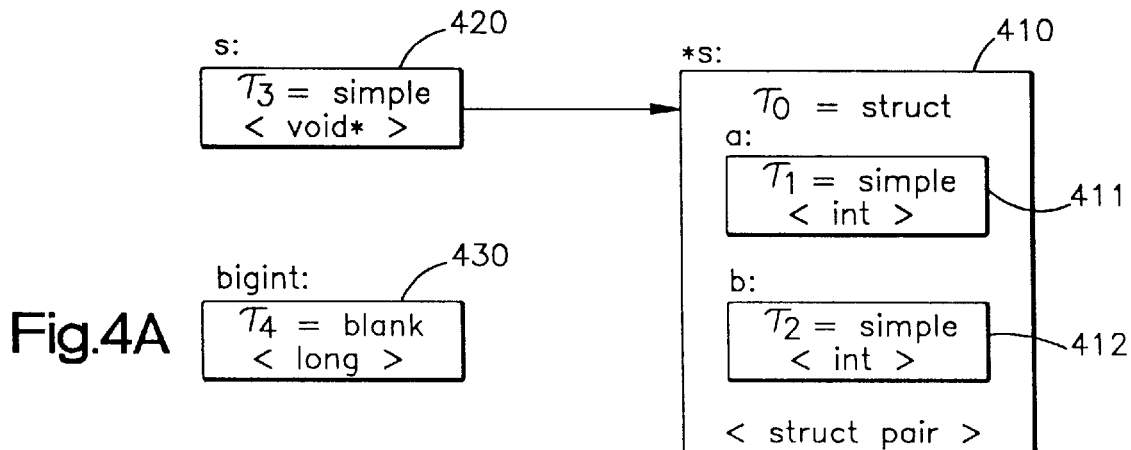
FIGS. 4A and 4B illustrate for one embodiment graphical representations of types for another sample program fragment.
Figure 4B:
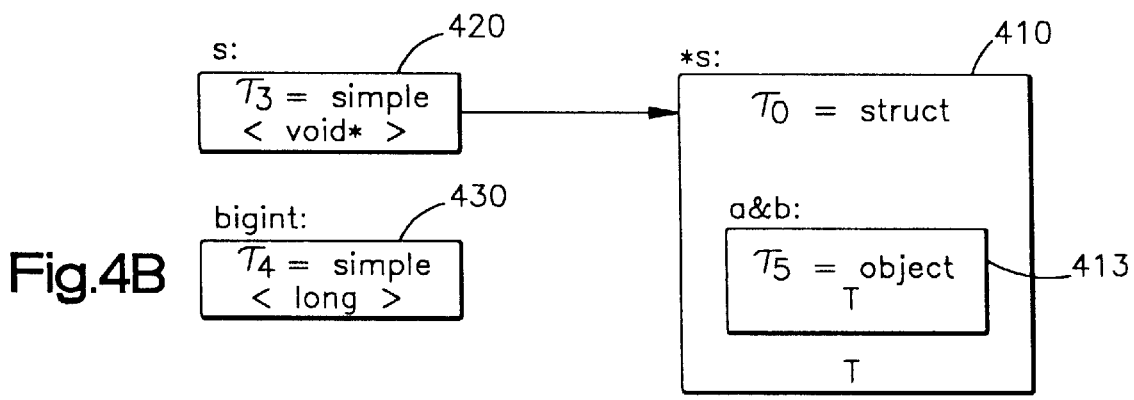

FIGS. 4A and 4B illustrate for one embodiment graphical representations for types describing locations at different stages of the analysis for the following sample C program fragment.

```
struct pair {int a; int b;} *s;
long bigint;
*(&s->a) = 4;
*(&s->b) = 5;
*((long*)&s->a) = bigint;
```

This sample program fragment implements an assignment of the value of the variable bigint to the location representing s->a. As the value being assigned is larger in size than the location representing s->a, the assignment leads to the capture of the neighboring location representing s->b by the type representing the location representing s->a.

After analysis of only the *(&s->a)=4 and *(&s->b)=5 statements, the pointer analysis represents, using the above types, the locations representing *s, s->a, s->b, s, and bigint with types 410, 411, 412, 420, and 430, respectively, as illustrated in FIG. 4A. Types 410–412, 420, and 430 describe these locations as follows.

*s: $\tau_0$=struct([a→$\tau_1$,b→$\tau_2$],<struct pair>,Ø)
s->a: $\tau_1$=simple((⊥×zero),⊥,<int>,{$\tau_0$})
s->b: $\tau_2$=simple((⊥×zero),⊥,<int>,{$\tau_0$})
s: $\tau_3$=simple(($\tau_0$×zero),⊥,<void*>,Ø)
bigint: $\tau_4$=blank(<long>,Ø)

After analysis of the *((long*)&s->a)=bigint statement in addition to the previously analyzed statements, the pointer analysis represents the locations representing *s, s->a, s->b, s, and bigint with types 410, 413, 413, 420, and 430, respectively, as illustrated in FIG. 4B. Types 410, 413, 420, and 430 describe these locations as follows.

*s: $\tau_0$=struct([a→$\tau_5$,b→$\tau_5$],T,Ø)
s->a: $\tau_5$=object((⊥×zero),⊥,T,{$\tau_0$})
s->b: $\tau_5$
s: $\tau_3$=simple(($\tau_0$×zero),⊥,<void*>,Ø)
bigint: $\tau_4$=simple((⊥×zero),⊥,<long>,Ø)

Figure 5A:
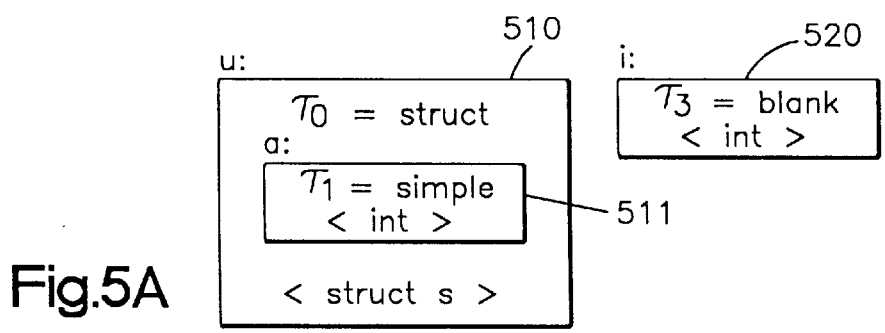
FIGS. 5A and 5B illustrate for one embodiment graphical representations of types for another sample program fragment.
Figure 5B:
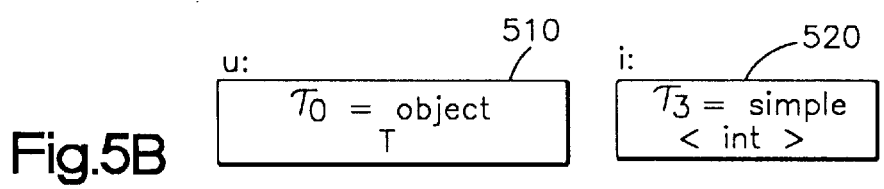

FIGS. 5A and 5B illustrate for one embodiment graphical representations for types describing locations at different stages of the analysis for the following sample C program fragment.

```
struct s {int a; int *b;};
union (int c; struct s d;) u;
int i;
u.d.a = 5;
u.c = i;
```

This sample program fragment implements an assignment from the location representing the variable i to the location representing the element u.c. The assigned-from and assigned-to locations have different access patterns, and therefore the assigned-to location must be described by a type describing the inconsistent access.

After analysis of only the u.d.a=5 statement, the pointer analysis represents, using the above types, the locations representing u, u.d.a, and i with types 510, 511, and 520, respectively, as illustrated in FIG. 5A. The element u.d.b is not represented with a type because the element u.d.b has not been accessed at this point. Types 510–511 and 520 describe the represented locations as follows.

u: $\tau_0$=struct([a→$\tau_1$],<struct s>,Ø)
u.d.a: $\tau_1$=simple((⊥×zero),⊥,<int>,{$\tau_0$})
i: $\tau_3$=blank(<int>,Ø)

After analysis of both the u.d.a=5 and the u.c=i statements, the pointer analysis represents the locations representing u and i with types 510 and 520, respectively, as illustrated in FIG. 5B. Types 510 and 520 describe these locations as follows.

u: $\tau_0$=object((⊥×zero),⊥,T,Ø)
i: $\tau_3$=simple((⊥×zero),⊥,<int>,Ø)

Figure 6A:
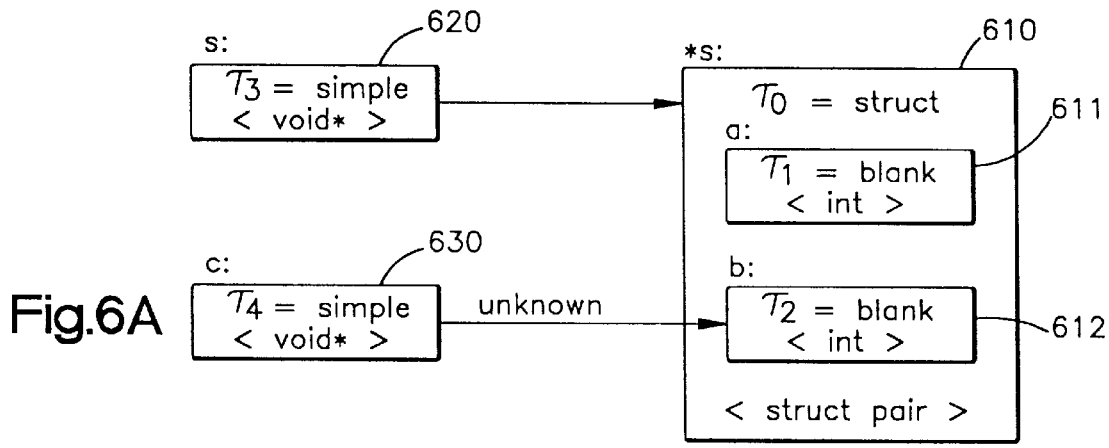
FIGS. 6A and 6B illustrate for one embodiment graphical representations of types for another sample program fragment.
Figure 6B:
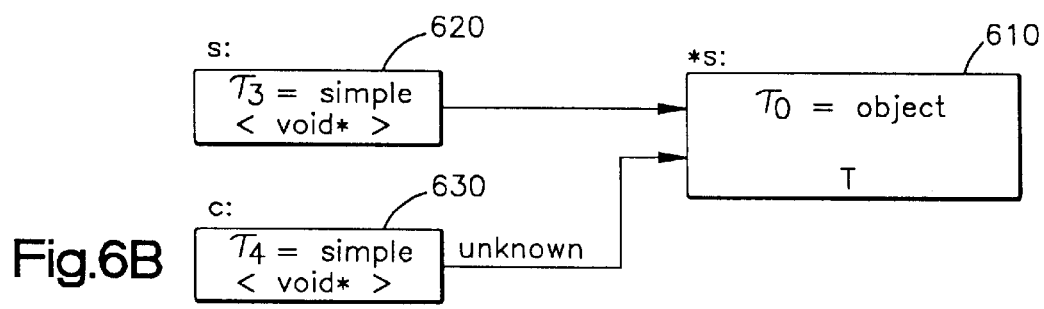

FIGS. 6A and 6B illustrate for one embodiment graphical representations for types describing locations at different stages of the analysis for the following sample C program fragment.

```
struct pair {int a; int b;} *s;
int *c;
c=(&s->b)−1;
*c=5;
```

This sample program fragment implements the inconsistent access of the structure variable *s due to pointer arithmetic on the address of s->b, an assignment of the created offset pointer to the location representing the variable c, and an assignment of a value to the location pointed-to by the offset pointer c. The location representing the variable c must therefore be described by a type describing the offset pointer, and the location pointed-to by the offset pointer c, i.e., the location representing the structure variable *s, must therefore be described by a type describing the inconsistent access.

After analysis of only the c=(&s->b)−1 statement, the pointer analysis represents, using the above types, the locations representing *s, s->a, s->b, s, and c with types 610, 611, 612, 620, and 630, respectively, as illustrated in FIG. 6A. Types 610–612, 620, and 630 describes these locations as follows.

*s: $\tau_0$=struct([a→$\tau_1$,b→$\tau_2$],<struct pair>,Ø)
s->a: $\tau_1$=blank(<int>,{$\tau_0$})
s->b: $\tau_2$=blank(<int>,{$\tau_0$})
s: $\tau_3$=simple(($\tau_0$×zero),⊥,<void*>,Ø)
c: $\tau_4$=simple(($\tau_2$×unknown),⊥,<void*>,Ø)

After analysis of both the c=(&s->b)−1 statement and the *c=5 statement, the pointer analysis represents the locations representing *s, s, and c with types 610, 620, and 630, respectively, as illustrated in FIG. 6B. Types 610, 620, and 630 describes these locations as follows.

*s: $\tau_0$=object((⊥×zero),⊥,T,Ø)
s: $\tau_3$=simple(($\tau_0$×zero),⊥,<void*>,Ø)
c: $\tau_4$=simple(($\tau_0$×unknown),⊥,<void*>,Ø)

Data Processing System

Figure 7:
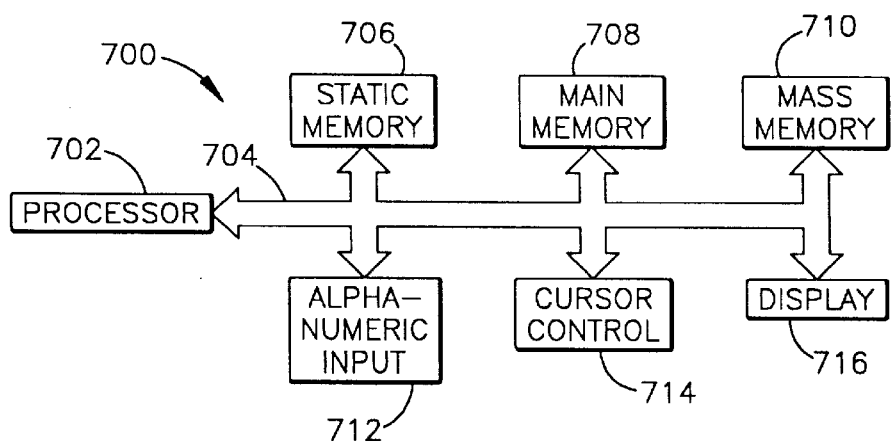
FIG. 7 illustrates for one embodiment a data processing system for performing a pointer analysis by type inference for a program with structured memory objects and potentially inconsistent memory object accesses.

For one embodiment, pointer analysis by type inference for a program with structured memory objects and potentially inconsistent memory object accesses may be implemented in software for execution by any suitable data processing system configured with any suitable combination of hardware devices. FIG. 7 illustrates for one embodiment a data processing system 700 that may be programmed to perform pointer analysis by type inference for a program with structured memory objects and potentially inconsistent memory object accesses.

As illustrated in FIG. 7, data processing system 700 comprises a processor 702, a system bus 704, a static memory 706, a main memory 708, a mass memory 710, an alphanumeric input device 712, a cursor control device 714, and a display 716. System bus 704 couples processor 702, static memory 706, main memory 708, mass memory 710, alphanumeric input device 712, cursor control device 714, and display 716.

Processor 702 comprises a suitable processing device such as a microprocessor, for example, and may comprise a plurality of suitable processing devices. Processor 702 may execute instructions stored in static memory 706, main memory 708, and/or mass memory 710 for example. Processor 702 may process data stored in static memory 706, main memory 708, and/or mass memory 710 for example.

Static memory 706 may comprise read only memory (ROM) or any other suitable memory device. Static memory 706 may store, for example, a boot program for execution by processor 702 to initialize data processing system 700. Main memory 708 may comprise random access memory (RAM) or any other suitable memory device. Mass memory 710 may comprise a hard disk device, a floppy disk, an optical disk, a flash memory device, a file server device, or any other suitable memory device. For this detailed description, the term memory comprises a single memory device and any combination of suitable memory devices for the storage of data and instructions, for example.

System bus 704 provides for the communication of digital information between hardware devices for data processing system 700. Processor 702 may receive over system bus 704 information that is input by a user through alphanumeric input device 712 and/or cursor control device 714. Alphanumeric input device 712 may comprise a keyboard, for example, that comprises alphanumeric keys. Alphanumeric input device 712 may comprise other suitable keys, comprising function keys for example. Alphanumeric input device 712 may be used to input information or commands, for example, for data processing system 700. Cursor control device 714 may comprise a mouse, touch tablet, track-ball, and/or joystick, for example, for controlling the movement of a cursor displayed by display 716.

Processor 702 may also output over system bus 704 information that is to be displayed on display 716. Display 716 may comprise a cathode ray tube (CRT) or a liquid crystal display (LCD), for example, for displaying information to a user. Processor 702 may use system bus 704 to transmit information to and to receive information from other hardware devices such as mass memory 710 for example.

Data processing system 700 may be programmed to execute suitable program code or machine instructions directing data processing system 700 to perform pointer analysis by type inference for a program with structured memory objects and potentially inconsistent memory object accesses. For one embodiment, the executable program code or machine instructions for the analysis may be stored in main memory 708 and/or in mass memory 710, such as on a suitable magnetic or optical disk for example, for execution by processor 702. The program analyzed by data processing system 700 may also be stored in main memory 708 and/or in mass memory 710, such as on a suitable magnetic or optical disk for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

APPENDIX A

```
      x =_s y:
            let   τ_1 = ecr(x)
                  τ_2 = ecr(y) in
  5         cjoin(s, τ_2, τ_1)

x =_s &y:
            let   τ_1 = ecr(x)
                  τ_2 = ecr(y) in
            ensure-sim/obj(τ_1, s)
 10         let sim/obj(α_1, λ_1, s_1, p_1) = type(τ_1) in
                  if s ⊄ s_1 then
                        expand(τ_1)
                  let (τ_3 × o_3) = α_1 in
                        join(τ_2, τ_3)

15   x =_s *y:
            let   τ_1 = ecr(x)
                  τ_2 = ecr(y) in
            ensure-sim/obj(τ_2, s)
            let sim/obj(α_2, λ_2, s_2, p_2) = type(τ_2) in
 20               let (τ_3 × o_3) = α_2 in
                        unless-zero(o_3, τ_3)
                  cjoin(s, τ_3, τ_1)

x =_s allocate(y)
            let τ = ecr(x) in
 25         ensure-sim/obj(τ, s)
            let sim/obj(α_1, λ_1, s_1, p_1) = type(τ) in
                  if s ⊄ s_1 then expand(τ)
                  let (τ_1 × o_1) = α_1 in
                        if type(τ_1) = ⊥ then
 30                           settype(τ_1, blank(T, ∅))

*x =_s y:
            let   τ_1 = ecr(x)
                  τ_2 = ecr(y) in
            ensure-sim/obj(τ_1, s)
 35         let sim/obj(α_1, λ_1, s_1, p_1) = type(τ_1) in
                  let (τ_3 × o_3) = α_1 in
                        unless-zero(o_3, τ_3)
                  cjoin(s, τ_2, τ_3)
```

-54-

Attorney's Docket No. 14-076

```
       x =ₛ op(y₁...yₙ):
           let τ = ecr(x) in
               for i ϵ [1...n] do
                   let τᵢ = ecr(yᵢ) in
 5                     cjoin(s,τᵢ,τ)
           ensure-sim/obj(τ,s)
           let sim/obj(α',λ',s',p') = type(τ) in
               let (τ' x o') = α' in
                   if type(o') = zero then
10                     make-unknown(o')

x =ₛ &y->n
           let  τ₁ = ecr(x)
                τ₀ = ecr(y) in
           ensure-sim/obj(τ₁,s)
15         ensure-sim/obj(τ₀,sizeof(void*))
           let    sim/obj(α₁,λ₁,s₁,p₁) = type(τ₁)
                  sim/obj(α₂,λ₂,s₂,p₂) = type(τ₀) in
               if s ⊈ s₁ then expand(τ₁)
               let  (τ₃ x o₃) = α₁
20                  (τ₄ x o₄) = α₂ in
                   if type(o₄) = unknown then
                       collapse(τ₄)
                       join(α₂,α₁)
                       if type(o₃) = zero then
25                         make-unknown(o₃)
                   else
                       pending(o₄)←pending(o₄) ∪ {<makeunknown,o₃>}
                       unless-zero(o₄,τ₄)
                       if type(τ₄) = ⊥ then
30                         m₅ = []
                           settype(τ₄,struct(m₅,sizeof(*y),∅))
                           make-compatible(n,m₅)
                       elseif type(τ₄) = blank(s₅,p₅) then
                           m₅ = []
35                         settype(τ₄,struct(m₅,s₅,p₅))
                           make-compatible(n,m₅)
                           join(m₅(n),τ₃)
                       elseif type(τ₄) = struct(m₅,s₅,p₅) then
                           make-compatible(n,m₅)
40                         join(m₅(n),τ₃)
                       else
                           promote(τ₄,sizeof(*y))
                           join(τ₄,τ₃)
                           if type(o₃) = zero then
45                             make-unknown(o₃)
```

```
x =_s fun(f_1...f_n)→(r_1...r_m)  S*
    let τ_0 = ecr(x) in
        ensure-sim/obj(τ_0, s)
        let sim/obj(α_0, λ_0, s_0, p_0) = type(τ_0) in
            if s ⊄ s_0 then
                expand(τ_0)
            if type(λ_0) = ⊥ then
                let [τ_1...τ_{n+m}] = MakeECR(n+m) in
                    let t = lam(τ_1...τ_n)(τ_{n+1}...τ_{n+m}) in
                        settype(λ_0, t)
            let lam(τ_1...τ_n)(τ_{n+1}...τ_{n+m}) = λ_0 in
                for i ∈ [1...n] do
                    let s_i = sizeof(f_i)
                        τ'_i = ecr(f_i) in
                            join(τ_i, τ'_i)
                for j ∈ [1...m] do
                    let s_{n+j} = sizeof(r_j)
                        τ'_{n+j} = ecr(r_j) in
                            join(τ'_{n+j}, τ_{n+j})

x_1...x_m =_{s_{n+1}...s_{n+m}} p(y_1...y_n)
    let τ_0 = ecr(p) in
        ensure-sim/obj(τ_0, sizeof(p))
        let sim/obj(α_0, λ_0, s_0, p_0) = type(τ_0) in
            if type(λ_0) = ⊥ then
                let [τ_1...τ_{n+m}] = MakeECR(n+m) in
                    let t = lam(τ_1...τ_n)(τ_{n+1}...τ_{n+m}) in
                        settype(λ_0, t)
            let lam(τ_1...τ_n)(τ_{n+1}...τ_{n+m}) = λ_0 in
                for i ∈ [1...n] do
                    let s_i = sizeof(y_i)
                        τ'_i = ecr(y_i) in
                            cjoin(s_i, τ'_i, τ_i)
                for j ∈ [1...m] do
                    let τ'_{n+j} = ecr(x_j) in
                        cjoin(s_{n+j}, τ_{n+j}, τ'_{n+j})
```

APPENDIX B

```
cjoin(s,e₁,e₂):
    pending(e₁)←pending(e₁) ∪ {<cjoin,s,e₁,e₂>}
    case type(e₁) of
        [⊥]: /* nothing */
        [blank(s₁,p₁)]:
            if s ⊄ s₁ then
                expand(e₁)
            elseif type(e₂) = ⊥ then
                settype(e₂,blank(s,∅))
            elseif s ⊄ sizeof(type(e₂)) then
                expand(e₂)
        [simple(α₁,λ₁,s₁,p₁)]:
            if s ⊄ s₁ then
                expand(e₁)
            else
                case type(e₂) of
                    [⊥]:
                        settype(e₂,simple(α₁,λ₁,s,∅))
                    [blank(s₂,p₂)]:
                        settype(e₂,simple(α₁,λ₁,s₂,p₂))
                        if s ⊄ s₂ then
                            expand(e₂)
                    [simple(α₂,λ₂,s₂,p₂)]:
                        join(α₁,α₂)
                        join(λ₁,λ₂)
                        if s ⊄ s₂ then
                            expand(e₂)
                    [struct(m₂,s₂,p₂)]:
                        promote(e₂,s₂)
                        cjoin(s,e₁,e₂)
                    [object(α₂,λ₂,s₂,p₂)]:
                        join(α₁,α₂)
                        join(λ₁,λ₂)
                        if s ⊂ s₂ then
                            expand(e₂)
        [struct(m₁,s₁,p₁)]:
            if s ⊄ s₁ then
                expand(e₁)
            else
                case type(e₂) of
                    [⊥]:
                        settype(e₂,struct(m₁,s,∅))
                    [blank(s₂,p₂)]:
                        settype(e₂,struct(m₁,s₂,p₂))
                        if s ⊄ s₂ then
                            expand(e₂)
```

```
            [simple(α₂,λ₂,s₂,p₂)]:
                promote(e₂,s₂)
                cjoin(s,e₁,e₂)
            [struct(m₂,s₂,p₂)]:
                if s₁ ⊆ s₂ ∧
                    ∀n∈Dom(m₁):make-compatible(n,m₂) then
                    for n ∈ Dom(m₁) do
                        cjoin(sizeof(n),m₁(n),m₂(n))
                else
                    expand(e₂)
                    cjoin(s,e₁,e₂)
            [object(α₂,λ₂,s₂,p₂)]:
                for n ∈ Dom(m₁) do
                    cjoin(sizeof(n),m₁(n),e₂)
                if s ⊄ s₂ then
                    expand(e₂)
    [object(α₁,λ₁,s₁,p₁)]:
        if type(e₂) = object(α₂,λ₂,⊤,∅) then
            join(α₁,α₂)
            join(λ₁,λ₂)
            if s ⊄ s₂ then
                expand(e₂)
        else
            promote(e₂,s)
            cjoin(s,e₁,e₂)

collapse(e):
    let τ = object(⊥,⊥,⊤,⊤) in
        unify(e,type(e),τ,pending(e),∅)

collapsetails(e,p₁,p₂):
    For each struct(m,_,_) t in p₁ and p₂ joins e with
    any location type in the co-domain of element mapping m
    that follows a location represented by e and sets the
    size of t to be ⊤ dofunpending(pen):
    for a ∈ pen do
        case a of
            [<join,e₁,e₂>]:
                join(e₁,e₂)

dolocpending(pen):
    for a ∈ pen do
        case a of
            [<join,e₁,e₂>]:
                join(e₁,e₂)
            [<cjoin,s,e₁,e₂>]:
                cjoin(s,e₁,e₂)
```

```
Dom(m):
     The domain of mapping m dooffsetpending(pen):
     for a ∈ pen do
          case a of
               [<collapse,τ>]:
                    collapse(τ)
               [<makeunknown,o>]:
                    make-unknown(o)

ecr(x):
     Returns the type variable implemented as an
equivalence class representative (ECR) for the type
associated with the variable x in the typing
environment ecr-union($e_1, e_2$):
     Performs a fast-union/find union operation on the
ECRs $e_1$ and $e_2$ and returns the value of a subsequent
find operation on one of them ensure-sim/obj(τ,s):
     case type(τ) of
          [⊥]:
               settype(τ,simple(⊥,⊥,s,∅))
          [blank(s',p)]:
               settype(τ,simple(⊥,⊥,s',p))
               if s ⊄ s' then
                    expand(τ)
          [simple(α,λ,s',p)]:
               if s ⊄ s' then
                    expand(τ)
          [struct(m,s',p)]:
               promote(τ,s')
          [object(α,λ,s',p)]:
               if s ⊄ s' then
                    expand(τ)

expand(e):
     let τ = blank(T,∅) in
        unify(e,type(e),τ,pending(e),∅)

join(($τ_1$ x $o_1$),($τ_2$ x $o_2$)):
     if type($o_1$) = zero then
          pending($o_1$)←pending($o_1$) ∪ {<makeunknown,$o_2$>}
     elseif type($o_2$) = zero then
          make-unknown($o_2$)
     join($τ_1, τ_2$)
```

```
join(e₁,e₂):
    if type(e₁) = ⊥ then
        pending(e₁)←pending(e₁) ∪ {<join,e₁,e₂>}
    else
        let  t₁ = type(e₁)
             t₂ = type(e₂)
             e  = ecr-union(e₁,e₂)
             pen₁ = pending(e₁)
             pen₂ = pending(e₂) in
            unify(e,t₁,t₂,pen₁,pen₂)

make-compatible(n,m):
    Modifies mapping m to be compatible with access of
    structure element n and returns a boolean value
    indicating the success of this modification MakeECR(x):
    Returns a list of x new ECRs, each with an
    associated ⊥ type constructor make-unknown(o):
    type(o)←unknown
    dooffsetpending(pending(o))

promote(e,s):
    let τ = object(⊥,⊥,s,∅) in
        unify(e,type(e),τ,pending(e),∅)

settype(e,t):
    type(e)←t
    dolocpending(pending(e))

type(E):
    Returns the type constructor associated with the
    ECR E
```

```
unify(e,τ₁,τ₂,pen₁,pen₂) :
    case τ₁ of
        [⊥]:
            if τ₂ = ⊥ then
                type(e)←⊥
                pending(e)←pen₁ ∪ pen₂
            else
                type(e)←τ₂
                pending(e)←pen₂
                dolocpending(pen₁)
        [blank(s₃,p₃)]:
            case τ₂ of
                [⊥]:
                    type(e)←τ₁
                    pending(e)←pen₁
                    dolocpending(pen₂)
                [blank(s₄,p₄)]:
                    pending(e)←pen₁ ∪ pen₂
                    if s₄ = T then
                        type(e)←blank(s₄,p₃⊔p₄)
                    else
                        type(e)←blank(s₃,p₃⊔p₄)
                    if p₃ = T then
                        for a ∈ p₄ do
                            unify(e,type(a),type(e),
                                  pending(a),pending(e))
                    if p₄ = T then
                        for a ∈ p₃ do
                            unify(e,type(a),type(e),
                                  pending(a),pending(e))
                    if s₃ ≠ s₄ or s₃ = s₄ = T then
                        collapsetails(e,p₃,p₄)
                [simple(α₄,λ₄,s₄,p₄)]:
                    if s₄ = T then
                        type(e)←simple(α₄,λ₄,s₄,p₃⊔p₄)
                    else
                        type(e)←simple(α₄,λ₄,s₃,p₃⊔p₄)
                    pending(e)←pen₂
                    dolocpending(pen₁)
                    if p₃ = T then
                        for a ∈ p₄ do
                            unify(e,type(a),type(e),
                                  pending(a),pending(e))
                    if p₄ = T then
                        for a ∈ p₃ do
                            unify(e,type(a),type(e),
                                  pending(a),pending(e))
                    if s₃ ≠ s₄ or s₃ = s₄ = T then
                        collapsetails(e,p₃,p₄)
```

```
          [struct(m₄,s₄,p₄)]:
              if s₄ = T then
                  type(e)←struct(m₄,s₄,p₃⊔p₄)
              else
                  type(e)←struct(m₄,s₃,p₃⊔p₄)
              pending(e)←pen₂
              dolocpending(pen₁)
              if p₃ = T then
                  for a ϵ p₄ do
                      unify(e,type(a),type(e),
                                  pending(a),pending(e))
              if p₄ = T then
                  for a ϵ p₃ do
                      unify(e,type(a),type(e),
                                  pending(a),pending(e))
              if s₃ ≠ s₄ or s₃ = s₄ = T then
                  collapsetails(e,p₃,p₄)
          [object(α₄,λ₄,s₄,p₄)]:
              if s₄ = T then
                  type(e)←object(α₄,λ₄,s₄,p₃⊔p₄)
              else
                  type(e)←object(α₄,λ₄,s₃,p₃⊔p₄)
              pending(e)←pen₂
              dolocpending(pen₁)
              if p₃ = T then
                  for a ϵ p₄ do
                      unify(e,type(a),type(e),
                                  pending(a),pending(e))
              if p₄ = T then
                  for a ϵ p₃ do
                      unify(e,type(a),type(e),
                                  pending(a),pending(e))
              if s₃ ≠ s₄ or s₃ = s₄ = T then
                  collapsetails(e,p₃,p₄)
  [simple(α₃,λ₃,s₃,p₃)]:
      case τ₂ of
      [⊥]:
          type(e)←τ₁
          pending(e)←pen₁
          dolocpending(pen₂)
```

```
[blank(s₄,p₄)]:
    if s₄ = T then
        type(e)←simple(α₃,λ₃,s₄,p₃⊔p₄)
    else
        type(e)←simple(α₃,λ₃,s₃,p₃⊔p₄)
    pending(e)←pen₁
    dolocpending(pen₂)
    if p₃ = T then
        for a ∈ p₄ do
            unify(e,type(a),type(e),
                  pending(a),pending(e))
    if p₄ = T then
        for a ∈ p₃ do
            unify(e,type(a),type(e),
                  pending(a),pending(e))
    if s₃ ≠ s₄ or s₃ = s₄ = T then
        collapsetails(e,p₃,p₄)
[simple(α₄,λ₄,s₄,p₄)]:
    if s₄ = T then
        type(e)←simple(α₃,λ₃,s₄,p₃⊔p₄)
    else
        type(e)←simple(α₃,λ₃,s₃,p₃⊔p₄)
    pending(e)←pen₁ ∪ pen₂
    let  (τ₃ × o₃) = α₃
         (τ₄ × o₄) = α₄ in
        let τ = ecr-union(τ₃,τ₄) in
            unify(τ,type(τ₃),type(τ₄),
                  pending(τ₃),pending(τ₄))
        let o = ecr-union(o₃,o₄) in
            unify(o,type(o₃),type(o₄),
                  pending(o₃),pending(o₄))
    let λ = ecr-union(λ₃,λ₄) in
        unify(λ,type(λ₃),type(λ₄),
              pending(λ₃),pending(λ₄))
    if p₃ = T then
        for a ∈ p₄ do
            unify(e,type(a),type(e),
                  pending(a),pending(e))
    if p₄ = T then
        for a ∈ p₃ do
            unify(e,type(a),type(e),
                  pending(a),pending(e))
    if s₃ ≠ s₄ or s₃ = s₄ = T then
        collapsetails(e,p₃,p₄)
```

```
[struct(m₄,s₄,p₄)]:
    if s₄ = T then
        type(e)←object(α₃,λ₃,s₄,p₃⊔p₄)
    else
        type(e)←object(α₃,λ₃,s₃,p₃⊔p₄)
    dolocpending(pen₁)
    dolocpending(pen₂)
    for n ε Dom(m₄) do
        unify(e,type(e),type(m₄(n)),
                pending(e),pending(m₄(n)))
    if p₃ = T then
        for a ε p₄ do
            unify(e,type(a),type(e),
                    pending(a),pending(e))
    if p₄ = T then
        for a ε p₃ do
            unify(e,type(a),type(e),
                    pending(a),pending(e))
    if s₃ ≠ s₄ or s₃ = s₄ = T then
        collapsetails(e,p₃,p₄)
[object(α₄,λ₄,s₄,p₄)]:
    if s₄ = T then
        type(e)←object(α₃,λ₃,s₄,p₃⊔p₄)
    else
        type(e)←object(α₃,λ₃,s₃,p₃⊔p₄)
    pending(e)←pen₂
    dolocpending(pen₁)
    let (τ₃ x o₃) = α₃
        (τ₄ x o₄) = α₄ in
        let τ = ecr-union(τ₃,τ₄) in
            unify(τ,type(τ₃),type(τ₄),
                    pending(τ₃),pending(τ₄))
        let o = ecr-union(o₃,o₄) in
            unify(o,type(o₃),type(o₄),
                    pending(o₃),pending(o₄))
    let λ = ecr-union(λ₃,λ₄) in
        unify(λ,type(λ₃),type(λ₄),
                pending(λ₃),pending(λ₄))
    if p₃ = T then
        for a ε p₄ do
            unify(e,type(a),type(e),
                    pending(a),pending(e))
    if p₄ = T then
        for a ε p₃ do
            unify(e,type(a),type(e),
                    pending(a),pending(e))
    if s₃ ≠ s₄ or s₃ = s₄ = T then
        collapsetails(e,p₃,p₄)
```

```
           [struct(m₃,s₃,p₃)]:
              case τ₂ of
                 [⊥]:
                    type(e)←τ₁
 5                  pending(e)←pen₁
                    dolocpending(pen₂)
                 [blank(s₄,p₄)]:
                    if s₄ = T then
                       type(e)←struct(m₃,s₄,p₃⊔p₄)
10                  else
                       type(e)←struct(m₃,s₃,p₃⊔p₄)
                    pending(e)←pen₁
                    dolocpending(pen₂)
                    if p₃ = T then
15                     for a ∈ p₄ do
                          unify(e,type(a),type(e),
                                pending(a),pending(e))
                    if p₄ = T then
                       for a ∈ p₃ do
20                        unify(e,type(a),type(e),
                                pending(a),pending(e))
                    if s₃ ≠ s₄ or s₃ = s₄ = T then
                       collapsetails(e,p₃,p₄)
                 [simple(α₄,λ₄,s₄,p₄)]:
25                  if s₄ = T then
                       type(e)←object(α₄,λ₄,s₄,p₃⊔p₄)
                    else
                       type(e)←object(α₄,λ₄,s₃,p₃⊔p₄)
                    dolocpending(pen₁)
30                  dolocpending(pen₂)
                    for n ∈ Dom(m₃) do
                       unify(e,type(e),type(m₃(n)),
                             pending(e),pending(m₃(n)))
                    if p₃ = T then
35                     for a ∈ p₄ do
                          unify(e,type(a),type(e),
                                pending(a),pending(e))
                    if p₄ = T then
                       for a ∈ p₃ do
40                        unify(e,type(a),type(e),
                                pending(a),pending(e))
                    if s₃ ≠ s₄ or s₃ = s₄ = T then
                       collapsetails(e,p₃,p₄)
```

```
            [struct(m₄,s₄,p₄)]:
              if s₄ = T then
                type(e)←struct(m₃,s₄,p₃⊔p₄)
              else
  5             type(e)←struct(m₃,s₃,p₃⊔p₄)
              pending(e)←pen₁ ∪ pen₂
              for n ∈ Dom(m₄) do
                make-compatible(n,m₃)
                  let e' = ecr-union(m₃(n),m₄(n)) in
 10                 unify(e',type(m₃(n)),type(m₄(n)),
                                pending(m₃(n)),pending(m₄(n)))
              if p₃ = T then
                  for a ∈ p₄ do
                    unify(e,type(a),type(e),
 15                          pending(a),pending(e))
              if p₄ = T then
                  for a ∈ p₃ do
                    unify(e,type(a),type(e),
                           pending(a),pending(e))
 20           if s₃ ≠ s₄ or s₃ = s₄ = T then
                collapsetails(e,p₃,p₄)
            [object(α₄,λ₄,s₄,p₄)]:
              if s₄ = T then
                type(e)←object(α₄,λ₄,s₄,p₃⊔p₄)
 25           else
                type(e)←object(α₄,λ₄,s₃,p₃⊔p₄)
              pending(e)←pen₂
              dolocpending(pen₁)
              for n ∈ Dom(m₃) do
 30             unify(e,type(e),type(m₃(n)),
                       pending(e),pending(m₃(n)))
              if p₃ = T then
                  for a ∈ p₄ do
                    unify(e,type(a),type(e),
 35                          pending(a),pending(e))
              if p₄ = T then
                  for a ∈ p₃ do
                    unify(e,type(a),type(e),
                           pending(a),pending(e))
 40           if s₃ ≠ s₄ or s₃ = s₄ = T then
                collapsetails(e,p₃,p₄)
```

```
                    [object(α₃,λ₃,s₃,p₃)]:
                        case τ₂ of
                            [⊥]:
                                type(e)←τ₁
 5                              pending(e)←pen₁
                                dolocpending(pen₂)
                            [blank(s₄,p₄)]:
                                if s₄ = T then
                                    type(e)←object(α₃,λ₃,s₄,p₃⊔p₄)
10                              else
                                    type(e)←object(α₃,λ₃,s₃,p₃⊔p₄)
                                pending(e)←pen₁
                                dolocpending(pen₂)
                                if p₃ = T then
15                                  for a ∈ p₄ do
                                        unify(e,type(a),type(e),
                                              pending(a),pending(e))
                                if p₄ = T then
                                    for a ∈ p₃ do
20                                      unify(e,type(a),type(e),
                                              pending(a),pending(e))
                                if s₃ ≠ s₄ or s₃ = s₄ = T then
                                    collapsetails(e,p₃,p₄)
                            [simple(α₄,λ₄,s₄,p₄)]:
25                              if s₄ = T then
                                    type(e)←object(α₃,λ₃,s₄,p₃⊔p₄)
                                else type(e)←object(α₃,λ₃,s₃,p₃⊔p₄)
                                pending(e)←pen₁
                                dolocpending(pen₂)
30                              let  (τ₃ x o₃) = α₃
                                     (τ₄ x o₄) = α₄ in
                                    let τ = ecr-union(τ₃,τ₄) in
                                        unify(τ,type(τ₃),type(τ₄),
                                              pending(τ₃),pending(τ₄))
35                                  let o = ecr-union(o₃,o₄) in
                                        unify(o,type(o₃),type(o₄),
                                              pending(o₃),pending(o₄))
                                let λ = ecr-union(λ₃,λ₄) in
                                    unify(λ,type(λ₃),type(λ₄),
40                                        pending(λ₃),pending(λ₄))
                                if p₃ = T then
                                    for a ∈ p₄ do
                                        unify(e,type(a),type(e),
                                              pending(a),pending(e))
45                              if p₄ = T then
                                    for a ∈ p₃ do
                                        unify(e,type(a),type(e),
                                              pending(a),pending(e))
                                if s₃ ≠ s₄ or s₃ = s₄ = T then
50                                  collapsetails(e,p₃,p₄)
```

-67-

Attorney's Docket No. 14-076

```
[struct(m₄,s₄,p₄)]:
    if s₄ = T then
        type(e)←object(α₃,λ₃,s₄,p₃⊔p₄)
    else
        type(e)←object(α₃,λ₃,s₃,p₃⊔p₄)
    pending(e)←pen₁
    dolocpending(pen₂)
    for n ∈ Dom(m₄) do
        unify(e,type(e),type(m₄(n)),
              pending(e),pending(m₄(n)))
    if p₃ = T then
        for a ∈ p₄ do
            unify(e,type(a),type(e),
                  pending(a),pending(e))
    if p₄ = T then
        for a ∈ p₃ do
            unify(e,type(a),type(e),
                  pending(a),pending(e))
    if s₃ ≠ s₄ or s₃ = s₄ = T then
        collapsetails(e,p₃,p₄)
[object(α₄,λ₄,s₄,p₄)]:
    if s₄ = T then
        type(e)←object(α₃,λ₃,s₄,p₃⊔p₄)
    else
        type(e)←object(α₃,λ₃,s₃,p₃⊔p₄)
    pending(e)←pen₁ ∪ pen₂
    let  (τ₃ × o₃) = α₃
         (τ₄ × o₄) = α₄ in
        let τ = ecr-union(τ₃,τ₄) in
            unify(τ,type(τ₃),type(τ₄),
                  pending(τ₃),pending(τ₄))
        let o = ecr-union(o₃,o₄) in
            unify(o,type(o₃),type(o₄),
                  pending(o₃),pending(o₄))
    let λ = ecr-union(λ₃,λ₄) in
        unify(λ,type(λ₃),type(λ₄),
              pending(λ₃),pending(λ₄))
    if p₃ = T then
        for a ∈ p₄ do
            unify(e,type(a),type(e),
                  pending(a),pending(e))
    if p₄ = T then
        for a ∈ p₃ do
            unify(e,type(a),type(e),
                  pending(a),pending(e))
    if s₃ ≠ s₄ or s₃ = s₄ = T then
        collapsetails(e,p₃,p₄)
```

```
unify(e,o₁,o₂,pen₁,pen₂):
    case o₁ of
        [zero]:
            case o₂ of
                [zero]:
                    type(e)←zero
                    pending(e)←pen₁ ∪ pen₂
                [unknown]:
                    type(e)←unknown
                    pending(e)←pen₂
                    dooffsetpending(pen₁)
        [unknown]:
            case o₂ of
                [zero]:
                    type(e)←unknown
                    pending(e)←pen₁
                    dooffsetpending(pen₂)
                [unknown]:
                    type(e)←unknown
                    pending(e)←pen₁ ∪ pen₂ unify(e,λ₁,λ₂,pen₁,pen₂):
    case λ₁ of
        [⊥]:
            case λ₂ of
                [⊥]:
                    type(e)←⊥
                    pending(e)←pen₁ ∪ pen₂
                [lam(τ₁...τₙ)(τₙ₊₁...τₙ₊ⱼ)]:
                    type(e)←λ₂
                    pending(e)←pen₂
                    dofunpending(pen₁)
        [lam(τ₁...τₙ)(τₙ₊₁...τₙ₊ⱼ)]:
            case λ₂ of
                [⊥]:
                    type(e)←λ₁
                    pending(e)←pen₁
                    dofunpending(pen₂)
                [lam(τ'₁...τ'ₙ)(τ'ₙ₊₁...τ'ₙ₊ⱼ)]:
                    type(e)←λ₁
                    pending(e)←pen₁ ∪ pen₂
                    for i ∈ [1...n] do
                        let τ''ᵢ = ecr-union(τᵢ,τ'ᵢ) in
                            unify(τ''ᵢ,type(τᵢ),type(τ'ᵢ),
                                    pending(τᵢ),pending(τ'ᵢ))
                    for j ∈ [1...m] do
                        let τ''ₙ₊ⱼ = ecr-union(τₙ₊ⱼ,τ'ₙ₊ⱼ) in
                            unify(τ''ₙ₊ⱼ,type(τₙ₊ⱼ),type(τ'ₙ₊ⱼ),
                                    pending(τₙ₊ⱼ),pending(τ'ₙ₊ⱼ))
```

```
unless-zero(o,τ):
    if type(o) = zero then
        pending(o)←pending(o) ∪ {<collapse,τ>}
    else
        collapse(τ)
```

What is claimed is:

1. A method for performing a pointer analysis for a program with a data processing system, the method comprising the steps of:
   (a) identifying in the program one or more store usages accessing locations; and
   (b) generating a store model to approximate run-time store usage for the program, the store model comprising types having components representing locations for the identified store usage(s) such that the types describe access patterns for the locations for the identified store usage(s) based on how the identified store usage(s) access the locations and such that the types representing the locations for the identified store usage(s) comply with a typing constraint.

2. The method of claim 1, wherein the generating step (b) comprises the step of representing one location with a type describing the one location is accessed as a structured memory object.

3. The method of claim 2, wherein the generating step (b) comprises the step of representing the one location with a type comprising location types describing locations of elements of the structured memory object.

4. The method of claim 1, wherein the generating step (b) comprises the step of representing a location representing an element of a structured memory object with a type comprising a location type describing a location representing the structured memory object.

5. The method of claim 1, wherein the generating step (b) comprises the step of representing one location with a type describing the one location is accessed inconsistently if identified store usages define different access patterns for the one location.

6. The method of claim 1, wherein the generating step (b) comprises the step of representing one location with a type describing the one location is accessed inconsistently if an identified store usage accesses the one location through an offset pointer.

7. The method of claim 1, wherein the generating step (b) comprises the step of describing a location pointer for an identified store usage with a location type representing a pointed-to location and with an offset describing how the location pointer points to the pointed-to location relative to a beginning of the pointed-to location.

8. The method of claim 1, wherein the generating step (b) comprises the step of representing one location with a type describing a size of the one location.

9. The method of claim 1, wherein the generating step (b) comprises the step of describing a content of one location with a location type and a function type.

10. The method of claim 1, wherein each type is represented by a type variable and an associated type constructor.

11. The method of claim 1, wherein the generating step (b) comprises the step of unifying different types representing values of locations if a select one of the different types describes a potential pointer value.

12. The method of claim 1, wherein the method performs the pointer analysis while compiling the program for execution by a data processing system.

13. The method of claim 1, wherein the method performs the pointer analysis for a program browser.

14. The method of claim 1, wherein the generating step (b) comprises the steps of:
   i) determining whether the types representing the locations for one identified store usage comply with the typing constraint, and
   ii) if the types representing the locations for the one identified store usage do not comply with the typing constraint, modifying types representing locations for the one identified store usage to comply with the typing constraint.

15. The method of claim 14, wherein the identifying step (a) comprises the step of identifying a form of a program statement describing the one identified store usage, and wherein the determining step (b)(i) comprises the step of determining whether the types representing the locations for the one identified store usage comply with a type rule specifying the typing constraint for the identified program statement form.

16. A method for performing a pointer analysis for a program with a data processing system, the method comprising the steps of:
   identifying in the program a store usage accessing locations;
   determining whether types representing the locations for the identified store usage comply with a typing constraint;
   identifying any potential constraints for types representing locations for the identified store usage;
   if the types representing the locations for the identified store usage do not comply with the typing constraint, modifying types representing locations for the identified store usage to comply with the typing constraint, wherein the modifying step (d) comprises the step of representing locations for the identified store usage with a hierarchy of types describing access patterns for the locations for the identified store usage based on how the identified store usage accesses the locations; and
   modifying types representing locations for any identified potential constraints affected by the modifying step (d).

17. The method of claim 16, wherein the modifying step (d) comprises the step of representing one of the locations for the identified store usage with a type describing the one location is accessed as a structured memory object.

18. The method of claim 16, wherein the modifying step (d) comprises the step of representing one of the locations for the identified store usage with a type describing the one location is accessed inconsistently if the identified store usage and another store usage in the program define different access patterns for the one location.

19. The method of claim 16, wherein the modifying step (d) comprises the step of representing one of the locations for the identified store usage with a type describing the one location is accessed inconsistently if the identified store usage accesses the one location through an offset pointer.

20. The method of claim 16, wherein the modifying step (d) comprises the step of describing a location pointer for the identified store usage with a location type representing a pointed-to location and with an offset describing how the location pointer points to the pointed-to location relative to a beginning of the pointed-to location.

21. The method of claim 16, wherein the modifying step (d) comprises the step of representing one of the locations for the identified store usage with a type describing a size of the one location.

22. The method of claim 16, wherein one of the types comprises a location type and a function type, each describing a content of a location represented by the one type.

23. The method of claim 16, wherein each type is represented by a type variable and an associated type constructor.

24. The method of claim 16, wherein the identifying step (c) identifies a potential constraint in a pending set.

25. The method of claim 16, wherein the identifying step (c) comprises the step of identifying from the identified store usage an access pattern relationship for types representing locations for the identified store usage.

26. The method of claim 16, wherein the identifying step (c) comprises the step of identifying from the identified store usage a pointer offset relationship for types representing locations for the identified store usage.

27. The method of claim 16, wherein the identifying step (c) comprises the step of identifying from the identified store usage any potential points-to relationships for a type representing a non-pointer value.

28. The method of claim 16, wherein the program describes a plurality of store usages and wherein the method analyzes each described store usage only one time in an order independent of program control flow.

29. The method of claim 16, wherein the identifying step (a) comprises the step of identifying a form of a program statement describing the store usage, and wherein the determining step (b) comprises the step of determining whether the types representing the locations for the identified store usage comply with a type rule specifying the typing constraint for the identified program statement form.

30. The method of claim 16, wherein the method performs the pointer analysis while compiling the program for execution by a data processing system.

31. The method of claim 16, wherein the method performs the pointer analysis for a program browser.

32. A memory for storing software for execution by a data processing system to perform a pointer analysis for a program, the memory comprising:

program code stored by the memory for identifying a store usage in the program accessing locations; and program code stored by the memory for representing locations for the identified store usage with types having components describing access patterns for the locations for the identified store usage based on how the locations for the identified store usage are accessed in the program such that the types representing the locations for the identified store usage comply with a typing constraint.

33. The computer-readable medium of claim 32, wherein the program code (b) comprises program code for representing one of the locations for the identified store usage with a type describing the one location is accessed as a structured memory object.

34. The computer-readable medium of claim 33, wherein the program code (b) comprises program code for representing the one location with a type comprising location types describing locations of elements of the structured memory object.

35. The computer-readable medium of claim 32, wherein the program code (b) comprises program code for representing a location representing an element of a structured memory object with a type comprising a location type describing a location representing the structured memory object.

36. The computer-readable medium of claim 32, wherein the program code (b) comprises program code for representing one of the locations for the identified store usage with a type describing the one location is accessed inconsistently if the identified store usage and another store usage in the progam define different access patterns for the one location.

37. The computer-readable medium of claim 32, wherein the program code (b) comprises program code for representing one of the locations for the identified store usage with a type describing the one location is accessed inconsistently if the identified store usage accesses the one location through an offset pointer.

38. The computer-readable medium of claim 32, wherein the program code (b) comprises program code for describing a location pointer for the identified store usage with a location type representing a pointed-to location and with an offset describing how the location pointer points to the pointed-to location relative to a beginning of the pointed-to location.

39. The computer-readable medium of claim 32, wherein the program code (b) comprises program code for representing one of the locations for the identified store usage with a type describing a size of the one location.

40. The computer-readable medium of claim 32, wherein the program code (b) comprises program code for describing a content of one of the locations for the identified store usage with a location type and a function type.

41. The computer-readable medium of claim 32, comprising program code for representing each type by a type variable and an associated type constructor.

42. The computer-readable medium of claim 32, wherein the program code (b) comprises program code for unifying different types representing values of locations for the identified store usage if a select one of the different types describes a potential pointer value.

43. The computer-readable medium of claim 32, comprising program code for compiling the program for execution by a data processing system.

44. The computer-readable medium of claim 32, comprising program code for a program browser.

45. The computer-readable medium of claim 32, wherein the program code (b) comprises:

i) program code for determining whether the types representing the locations for the identified store usage comply with the typing constraint, and ii) program code for modifying types representing locations for the identified store usage to comply with the typing constraint if the types representing the locations for the identified store usage do not comply with the typing constraint.

46. The computer-readable medium of claim 45, wherein the program code (a) comprises program code for identifying a form of a program statement describing the store usage, and wherein the program code (b)(i) comprises program code for determining whether the types representing the locations for the identified store usage comply with a type rule specifying the typing constraint for the identified program statement form.

47. The computer-readable medium of claim 32, wherein the program code (b) comprises:

i) program code for determining whether the types representing the locations for the identified store usage comply with the typing constraint, ii) program code for identifying any potential constraints for types representing locations for the identified store usage, iii) program code for modifying types representing locations for the identified store usage to comply with the typing constraint if the types representing the locations for the identified store usage do not comply with the typing constraint, and iv) program code for modifying types representing locations for any identified potential constraints affected by the modification of types representing locations for the identified store usage.

48. The computer-readable medium of claim 47, wherein the program code (b)(ii) comprises program code for identifying a potential constraint in a pending set.

49. The computer-readable medium of claim 47, wherein the program code (b)(ii) comprises program code for identifying from the identified store usage an access pattern relationship for types representing locations for the identified store usage.

50. The computer-readable medium of claim 47, wherein the program code (b)(ii) comprises program code for identifying from the identified store usage a pointer offset relationship for types representing locations for the identified store usage.

51. The computer-readable medium of claim 47, wherein the program code (b)(ii) comprises program code for identifying from the identified store usage any potential points-to relationships for a type representing a non-pointer value.

52. The computer-readable medium of claim 47, wherein the program describes a plurality of store usages and wherein the program code of the computer-readable medium, when executed by a data processing system, analyzes each described store usage only one time in an order independent of program control flow.

53. A data processing system comprising:
  a) a translator for translating a program in a first language into code in a second language;
  b) a pointer analyzer for performing a pointer analysis for the program, the pointer analyzer for identifying in the program a store usage accessing locations and for representing locations for the identified store usage with a set of hierarchical types describing different access patterns for the locations for the identified store usage based on how the identified store usage accesses the locations such that the types representing the locations for the identified store usage comply with a typing constraint;
  c) a store model for storing the types representing locations for the program; and
  d) an optimizer for optimizing the code based on the store model.

54. The data processing system of claim 53, comprising a symbol table for identifying locations for the program.

55. The data processing system of claim 53, wherein the pointer analyzer represents one of the locations for the identified store usage with a type describing the one location is accessed as a structured memory object.

56. The data processing system of claim 53, wherein the pointer analyzer represents one of the locations for the identified store usage with a type describing the one location is accessed inconsistently if the identified store usage and another store usage in the program define different access patterns for the one location.

57. The data processing system of claim 53, wherein the pointer analyzer represents one of the locations for the identified store usage with a type describing the one location is accessed inconsistently if the identified store usage accesses the one location through an offset pointer.

58. The data processing system of claim 53, wherein the pointer analyzer describes a location pointer for the identified store usage with a location type representing a pointed-to location and with an offset describing how the location pointer points to the pointed-to location relative to a beginning of the pointed-to location.

59. The data processing system of claim 53, wherein the pointer analyzer represents one of the locations for the identified store usage with a type describing a size of the one location.

60. The data processing system of claim 53, wherein the pointer analyzer describes a content of one of the locations for the identified store usage with a location type and a function type.

61. The data processing system of claim 53, wherein each type is represented by a type variable and an associated type constructor.

62. The data processing system of claim 53, wherein the pointer analyzer determines whether the types representing the locations for the identified store usage comply with the typing constraint and modifies types representing locations for the identified store usage to comply with the typing constraint if the types representing the locations for the identified store usage do not comply with the typing constraint.

63. A method for performing a pointer analysis for a program with a data processing system, the method comprising:
  (a) identifying in the program one or more store usages accessing locations; and
  (b) generating a store model to approximate run-time store usage for the program, the store model comprising types representing locations for the identified store usage(s) such that the types describe access patterns for the locations for the identified store usage(s) based on how the identified store usage(s) access the locations wherein the types are comprised of components defining such access patterns.

64. The method of claim 63 wherein the types comprise a hierarchy of types.

65. The method of claim 64 wherein types ma y be p romot ed to ty pes higher in the hierarchy based on constraints.

66. The method of claim 64 wherein one type describes locations whose content values are used only as a unit, and a fuirther type describes locations whose content values are used only as structured objects.

67. The method of claim 64 whe rein one type describes locations whose content values are used in inconsistent manners by use of components comprising a size, a parent type, a location pointer type, and a function type.

68. The method of claim 63 wherein access patterns for various types are described by components selected from the group consisting of size, parent type, location pointer type, function type, element mapping type, and an offset type.

69. A method for identifying utilization of computer storage by a computer program, the method comprising:
  identifying portions of the program that utilize storage; and
  generating a store model by identifyWing each portion as a type from a hierarchy of types, each type identifying different access patterns based on how storage is accessed.

70. The method of claim 69 wherein the types comprise components selected from multiple components describing different access patterns.

71. A computer readable medium having instructions stored thereon for causing a computer to execute a method for performing a pointer analysis for a program with a data processing system, the method comprising:
  (a) identifying in the program one or more store usages accessing locations; and
  (b) generating a store model to approximate run-time store usage for the program, the store model comprising types representing locations for the identified store usage(s) such that the types describe access patterns for the locations for the identified store usage(s) based on how the identified store usage(s) access the locations wherein the types are comprised of components defining such access patterns.

* * * * *